US006421675B1

(12) United States Patent
Ryan et al.

(10) Patent No.: US 6,421,675 B1
(45) Date of Patent: Jul. 16, 2002

(54) SEARCH ENGINE

(75) Inventors: Grant James Ryan; Shaun William Ryan, both of Christchurch; Craig Matthew Ryan, Wellington; Wayne Alistar Munro; Del Robinson, both of Christchurch, all of (NZ)

(73) Assignee: S. L. I. Systems, Inc. (NZ)

( * ) Notice: Subject to any disclaimer, the term of this patent is extended or adjusted under 35 U.S.C. 154(b) by 0 days.

(21) Appl. No.: 09/115,802

(22) Filed: Jul. 15, 1998

Related U.S. Application Data

(60) Provisional application No. 60/078,199, filed on Mar. 16, 1998.

(51) Int. Cl.$^7$ ............................................. G06F 17/30
(52) U.S. Cl. ......................... 707/100; 707/501.1; 707/3
(58) Field of Search ................................ 707/1–4, 501, 707/513, 523, 100, 501.1; 709/206

(56) References Cited

U.S. PATENT DOCUMENTS

| | | | |
|---|---|---|---|
| 5,446,891 A | | 8/1995 | Kaplan et al. ................. 707/2 |
| 5,530,852 A | | 6/1996 | Meske, Jr. et al. .......... 709/206 |
| 5,659,732 A | * | 8/1997 | Kirsch ............................. 707/5 |
| 5,721,897 A | | 2/1998 | Rubinstein ..................... 707/2 |
| 5,778,367 A | * | 7/1998 | Wesinger, Jr. et al. ........ 707/10 |
| 5,819,092 A | * | 10/1998 | Ferguson et al. ............... 717/1 |
| 5,855,020 A | * | 12/1998 | Kirsch ........................... 707/10 |
| 5,996,007 A | * | 11/1999 | Klug et al. .................. 709/218 |
| 6,006,218 A | * | 12/1999 | Breese et al. ................... 707/3 |
| 6,029,182 A | * | 2/2000 | Nehab et al. ................ 707/523 |
| 6,041,326 A | * | 3/2000 | Amro et al. .................... 707/10 |
| 6,078,916 A | * | 6/2000 | Culliss ............................ 707/5 |
| 6,094,649 A | * | 7/2000 | Bowen et al. ................... 707/3 |
| 6,115,718 A | * | 9/2000 | Huberman et al. .......... 707/102 |

FOREIGN PATENT DOCUMENTS

| | | | |
|---|---|---|---|
| WO | WO 95/29451 | 11/1995 | ........... G06F/17/30 |
| WO | WO 96/23265 | 8/1996 | ........... G06F/17/30 |
| WO | WO 96/29661 | 9/1996 | ........... G06F/17/30 |
| WO | WO 97/22066 | 6/1997 | ........... G06F/17/21 |

OTHER PUBLICATIONS

"Go To Sells Positions", The Search Engine Report, Mar. 3, 1998, URL:http://www.searchenginewatch.com, in its entirety, pp. 1–5.

Kramer et al., "Thesaurus Federations: Loosely Integrated Thesauri for Document Retrieval in Networks Based on Internet Technologies", Journal of Heterocyclic Chemistry, vol. 1, No. 2, Sep. 1997, pp. 122–131.

"The New Meta Tags are Coming–or are They?" The Search Engine Report, Dec. 4, 1997, URL:http://www.searchengine.com, in its entirety, pp. 1–4.

* cited by examiner

*Primary Examiner*—Hosain T. Alam
*Assistant Examiner*—Ella Colbert
(74) *Attorney, Agent, or Firm*—Pillsbury Winthrop LLP

(57) ABSTRACT

The present invention provides for a method of updatig an internet search engine database with the results of a user's selection of specific web page listings from the general web page listing provided to the user as a result of his initial keyword search entry. By updating the database with the selections of many different users, the database can be updated to prioritize those web listings that have been selected the most with respect to a given keyword, and thereby presenting first the most popular web page listings in a subsequent search using the same keyword search entry.

5 Claims, 27 Drawing Sheets

SEARCH ENGINE

This application is related to U.S. Application No. Ser. 60/078,199 entitled "Improved Search Engine" that was filed on Mar. 16, 1998.

FIELD OF THE INVENTION

The present invention relates to a method and apparatus that allows for enhanced database searching, and more particularly; for use as an internet search engine.

BACKGROUND OF THE RELATED ART

An efficient and practical means of obtaining relevant information and also screening unwanted/uninteresting information has been an ongoing need, especially since the inception of the internet. This need is particularly acute at present due to the exponential growth in the number of world-wide web sites and the sheer volume of information contained therein. In an attempt to index the information available on the internet, a number of software search engines have been created via which a user enters a search command comprised of suitable keywords from a keyboard at his personal computer. The search command is transmitted to a server computer, the has a search engine associated with the server computer. The search engine receives the search command, and then using it scans for these key words through a database of web addresses and the text stored on the web sites. Thereafter, the results of the scan are transmitted from the server computer back to the user's computer and displayed on the screen of the user's computer.

In order for the search engine to be aware of new web sites and to update its records of existing sites, either the proprietors of the web sites notify the search engine themselves or the information may be obtained via a 'web crawler' to update the database at the server computer. A web crawler is an automated program which explores and records the contents of a web site and its inks to other sites, thereby spreading between sites in an attempt to index all the current sites.

This database structure and method of searching it poses some significant difficulties The internet growth-rate has resulted in a substantial backlog in the scanning of new sites, notwithstanding the fact that web sites are frequently deleted, re-addressed, updated and so forth thus leaving the search engine with outdated and/or misleading information. Although the web crawlers can be configured to prioritize possible key-words according to their location (title, embedded link, address etc), nevertheless, depending on the type of search engine used, substantial portions of the web site text (often involving the majority or even all of the site text) is still required to be scanned. This results in colossal storage requirements for the search engine. Furthermore, a typical key word search may bring up an excessively large volume of material, the majority of which may be of little interest to the user. The user typically makes a selection from the list based on the brief descriptions of the site and explores the chosen sites until the desired information is located.

These results are in the form of a list, ranked according to criteria specific to the search engine. These criteria may range from the number of occurrences of the key-words anywhere within the searched text, to methods giving a weighting to key-words used in particular positions (as previously mentioned). When multiple key-words have been used, sites are also ranked according to the number of different key-words applicable. A fundamental drawback of all these ranking systems is their objectivity—they are determined according to the programmed criteria of the search engine, and the emphasis placed on particular types of site design, rather than any measure of the actual users' opinions. Indeed this can lead to the absurd situation whereby in an attempt to ensure a favorable rating by the most commonly used search engines, some designers deliberately configure their sites in the light of the previously mentioned criteria, to the detriment of the presentation, readability and content of the site.

SUMMARY OF THE INVENTION

It is an object of the present invention to ameliorate the aforementioned disadvantages of conventional search engines by harnessing the cerebral power of the human operator.

It is a further object of the present invention to provide a novel search engine with enhanced efficiency, usability and effectiveness with a reduced system storage and/or computational requirements in comparison to existing software engines.

It is a further object of the present invention to provide a variety of indications of the popularity of the search data, together with an indication of its date of creation or updating.

In order to obtain the above recited advantages of the present invention, among others, one embodiment of the present invention provides for a method of updating an internet search engine database with the results of a user's selection of specific web page lists from the general web page listing provided to the user as a result of his initial keyword search entry. By updating the database with the selections of many different users, the database can be updated to prioritize those web listings that have been selected the most with respect to a given keyword, and hereby presenting first the most popular web page listings in a subsequent search using the same keyword search entry.

In another embodiment of the present invention, a method of determining content to provide along with listings transmitted from a server computer to user sites is provided. In this embodiment, there is obtained a content listing from each one of a plurality of different developer sites. Each of the content listings includes content, a developer identifier, and a keyword, and a keyword selection factor. Thereafter, there is determined a particular keyword from the obtained keywords that is the same for different content listings. For that particular keyword, the keyword selection factor is used in determining when to transmit different content listings to the user sites.

In still another embodiment, there is provided a method of updating a keyword table with the results of a user's selection of specific keywords which were obtained from a list of related keywords presented to the user. By updating the database with selections of many different users associated with t same keyword, appropriate keywords can be provided and presented first when that same keyword is subsequently entered.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 1A:
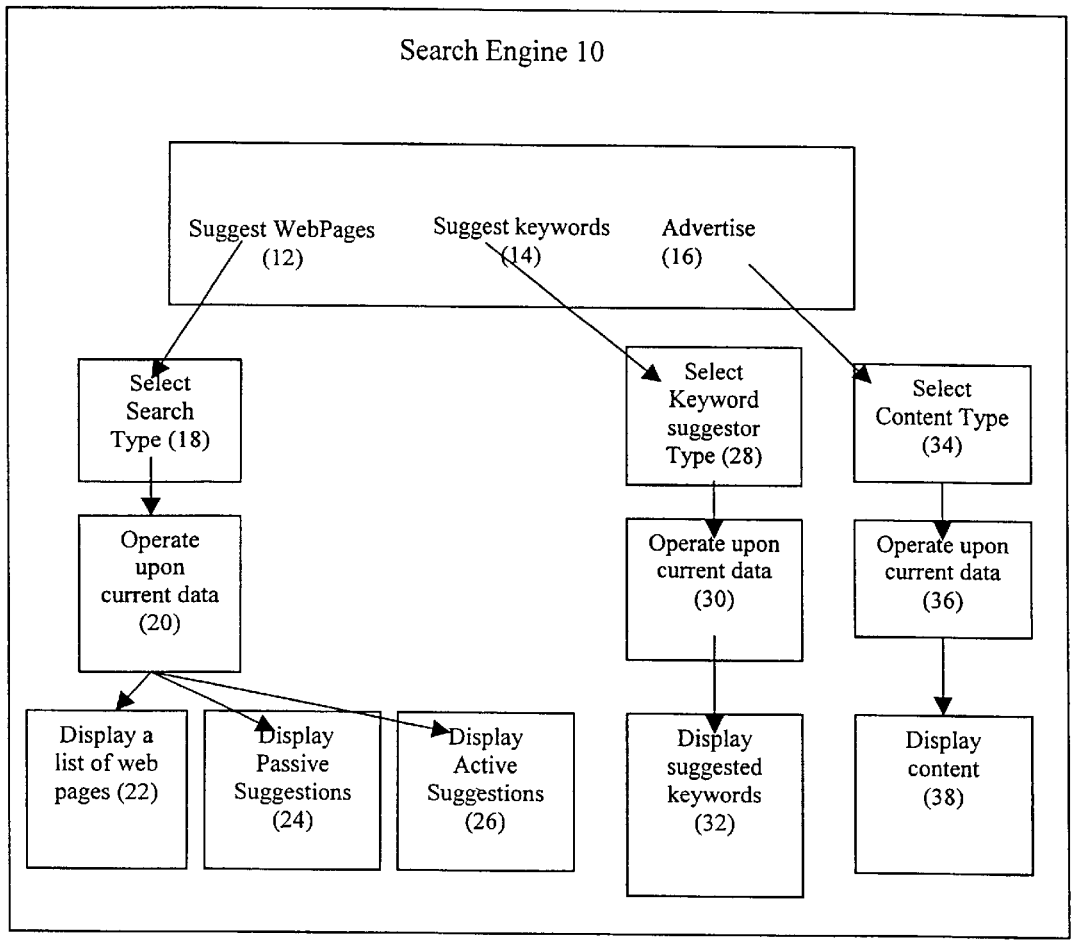
FIG. 1 illustrates certain of the overall features of the present invention.
Figure 1B:
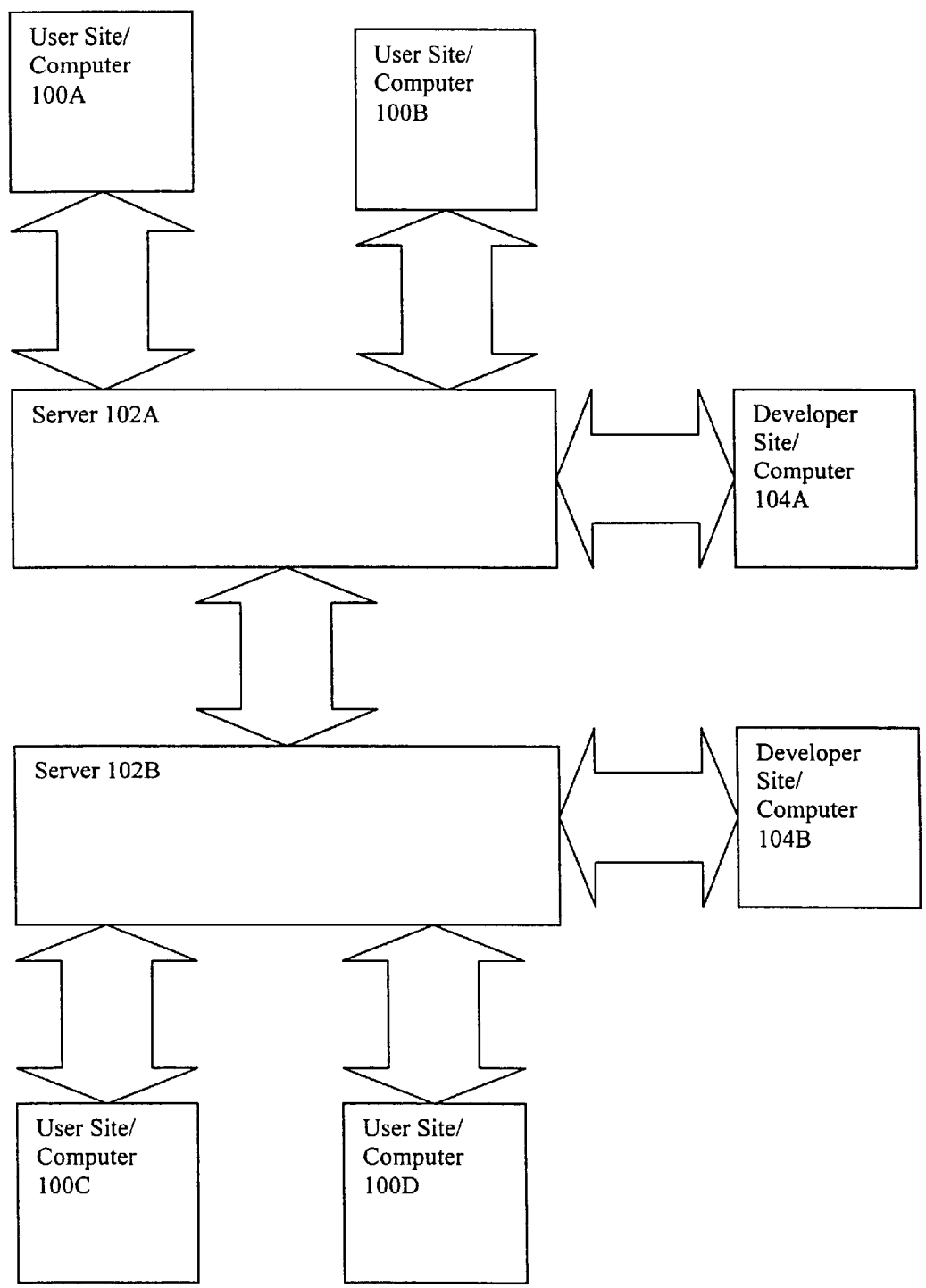

FIGS. 1A and 1B illustrate certain of the overall features of the present invention, which will be described in further detail hereinafter. It is initially noted that like numbered reference numerals in various Figures and descriptions will be used in the following descriptions to refer to the same or similar structures, actions or process steps.

The present invention is preferably implemented in a network environment wherein each computer contains, typically, a microprocessor, memory and modem, a certain of the computers contain displays and the like, as are well known. As shown in FIG. 1B, a plurality of user sites/computers 100A–100D are shown, as are a plurality of server computers 102A–B, and developer sites/computers 104A–B. It is understood that in a typical internet network, that different server computers 102 can be interconnected together, as is illustrated. Further, while only a few user sites, developer sites and server computers are shown, it is understood that thousands of such computers are interconnected together.

While the specific embodiments of tee present invention are written for applications in which the invention is implemented as sequences of coded program instructions operated upon by a server computer 102 as illustrated, it will be understood that certain sequences of these program instructions could instead be implemented in other forms, such as processors having specific instructions specifically tailored for the applications described hereinafter.

As will be illustrated hereinafter, additional operations, transparent to the user, are implemented in order to obtain search results in the future based upon currently made searches. As shown, the present invention has various capabilities, each of which are illustrated in a parallel flow in FIG. 1A, which illustrates an overview of the different capabilities that can be ongoing simultaneously. In terms of overall capabilities, start block 10 show three: suggesting web pages 12, suggesting keywords 14, and content suggestion 16.

In order for web pages 12 to be selected by a user according to the present invention, there is a step 18 in which the type of search to be performed is selected. Thereafter, in step 20, search input obtained from one of a variety of sources is input and used along with the algorithm selected in step 18 to determine search results. The results of this search are then displayed to the user, as shown by steps of displaying a created list of web pages, displaying passively suggested web pages, and displaying actively suggested web pages, identified as steps 22, 24, and 26, respectively, in FIG. 1. This capability, and how it is implemented, will be described in more detail hereinafter.

In order for keyword suggestion to take place, which the user may or may not select, there is preferably an initial step 28 in which the type of keyword search olgorithm to use is selected. Although many systems may have only one such algorithm, various ones, as described hereinafter, are possible. Once the keyword search olgorithm is selected, step 30 follows in which, based upon a keyword entered by a user, the current set of keyword data is operated upon to determine associated keywords. The results of this operation are then displayed to the user in 30. This capability, and how it is implemented, will be described in more detail hereinafter.

The previously mentioned web page and keyword selection capabilities inured to the direct benefit of the end user. Another novel feature of the present invention, which indirectly inures to the benefit of the end user, directly benefits the advertiser, because it allows for content to be targeted in real time based upon various criteria. As will be described more fully hereinafter, a content providing olgorithm is initially selected which will determine how content is selected in step 34. Step 36 follows, and based upon inputs from users and content providers, which content to show is determined. Thereafter, the advertisements are displayed for the user to see, simultaneously with the display of either keywords and/or web pages While FIG. 1 illustrates certain overall features according to the present invention, many of the advantageous features of the present invention are not, as mentioned previously, observable to the user, but instead transparent to user. They are, however, significant in order to fully explain how the present invention is implemented and are explained hereinafter.

Figure 2:
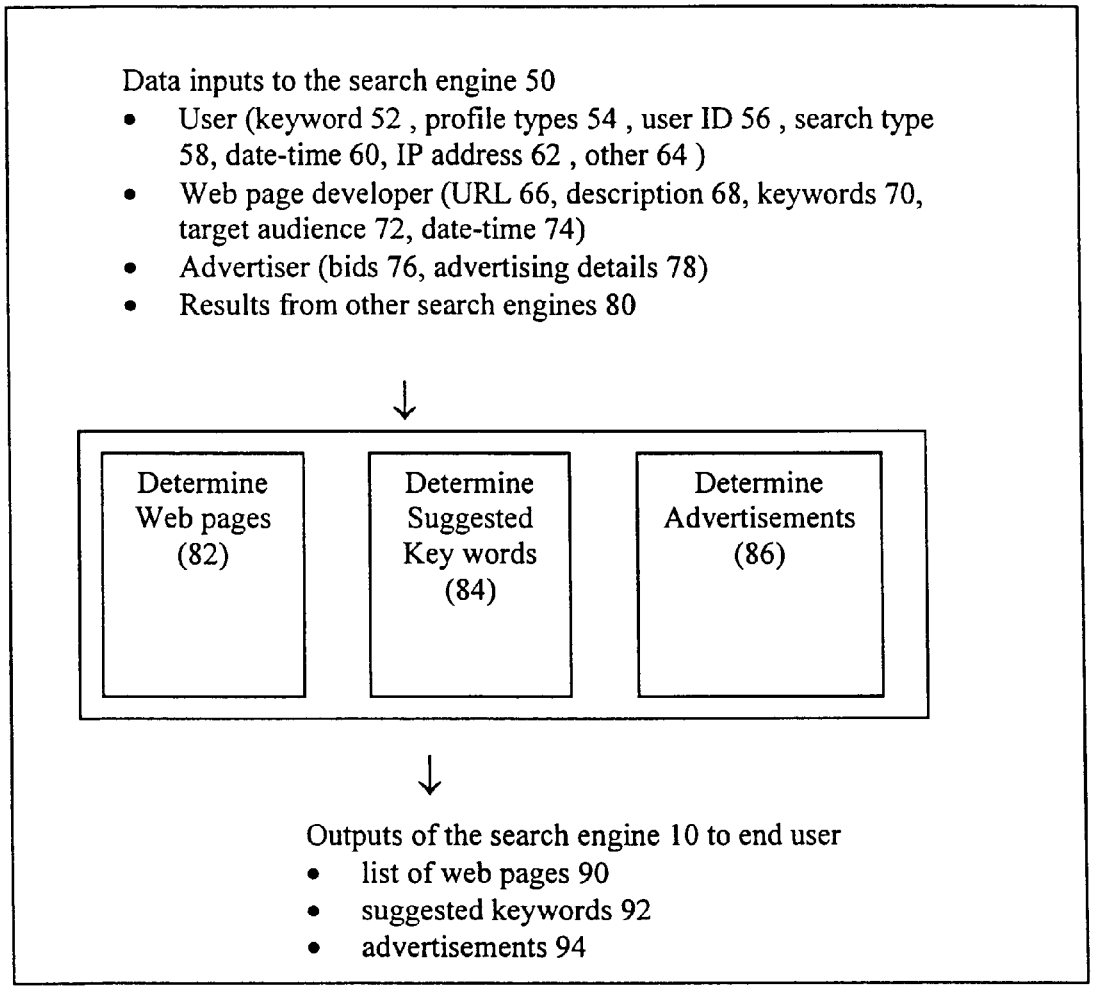
FIG. 2 illustrates various inputs to the search, and, for each often different capabilities, illustrates the outputs that will be provided engine according to the present invention.

FIG. 2 is provided to illustrate various inputs to the search engine according to the present invention, and, for different capabilities, illustrates the outputs that will be provided. More detailed explanations are provided hereinafter. Data that is potentially input from search engine user include:

keyword 52—this is the word or phrase that the user eater to find a list of web pages profile types 54—these are the groups of people they associate them selves with e.g. US, male, doctor etc.

user ID 56—this is a unique identification for each user that chooses to register with the search engine. This can be done via a cookie or logon.

search type 58—this can be actively chosen by the searcher to determine the type of search results they would like (popular, new, etc)

date-time 60—this is passively recorded when a searcher uses the system

IP address 62—this is passively recorded when a searcher uses the system other 64—this includes other personalization information such as search customization preferences, keywords for web page suggestion etc. This information is entered actively once by the user then used to personalize the search results each time the users (identified by user ID) uses the search engine.

Data from web-page developers include:

URL 66—this is the URL address of the web page or pages that they wish to submit description 68—this is a 2–3 line description of the information on their web-page keywords 70—these are the keywords that the web page developer would like to associate their web-page with target audience 72—these are the target audience (profile types 54) that the web page developer particularly want to target.

date-time 74—this is passively recorded when every a web-page developer submits a web page Data from content providers include:

bids 76—these are $ bids for content as described later.

content details 78—this includes all details of content providers including address, content details etc.

Results from other search engines 80—these are the results for a keyword search from other existing search engines.

Outputs of the search engine 10 are:

lists of web pages 90—depending on the input data a list of web pages can be produced in web page determination step 82, described further hereinafter;

content keywords 92—the search engine suggests other keywords for users to try produced in key word determination step 84, described further hereinafter; and content 94—the search engine sends out selected content as produced in determine content step 86, described further hereinafter To facilitate ease of reference and aid understanding, the aforementioned and subsequently mentioned data-set definitions are reiterated and expanded upon below (and where appropriate, the structure of the dependent data-sets used to create the defined data-set are shown in tabular form) with reference to the preferred embodiment of the present invention. Thereafter, certain of these will be explained in even greater detail to fully teach how to make and use the present invention.

Locations: a plurality of unique information entities.

Web-pages: Locations in the form of Web-pages URL Universal Reference Locator) addresses.

Key-word: The word or phrase that is entered in the search engine

Hit-list: The list of web-pages URL addresses) that is the result of the key-word search. This hit-list ranks the relevance of the web-pages relative to the key-word. This bit-list always has a key-word associated with it.

| Input data set | Output data set |
| --- | --- |
| Key-word (temporary) Database to match the key-word with (permanent) | Hit-list - Ranked hit-list of Web-pages (temporary) |

Permanent data set: Retained long tern (although it changes over time)

Temporary data set: Created only for the duration of the search

Surfer trace: This is a measure of bow users search. It is a trace of the key words they search for, the URLs subsequently selected and how long they spend there, from which a ranking of web-pages for a users (surfers) can be calculated. It is a measure of which web-pages they found most useful after the key-word search. The combination of all surfer traces is used to create a users' choice hit-list.

| Input data set | Output data set |
| --- | --- |
| Key-word (temporary) User selections from initial search results (temporary), i.e. Web pages visited (URLs) Times spent a each URL IP address of user | Surfer trace - A list of user web-pages users found useful for each key-word (can be permanent or temporary) |

Users' choice hit-list: This a semi-permanent ranking of web-pages associated with every key-word and indicates how useful Internet users found each of the web-pages associated with the key—word The users' choice hit-list is incrementally updated by a new surfer trace.

| Input data set | Output data set |
| --- | --- |
| Surfer trace (can be permanent or temporary) Users' choice hit-list (permanent)* | New Users' choice hit-list - Ranked hit-list of "popular" Web-pages (permanent) |

The initial users' choice hit-list will be the surfer trace.

New web-page list: This is a list of new web-pages that is created by URL submissions from web-page developers. When a web developer updates a web-page, they can submit the web-page address, brief information about the page and a list of key-words that the developer decides are relevant. The web-page is then placed on the top of each of the key-word new web-page lists.

| Input data set | Output data set |
| --- | --- |
| All web-page developers information about web address and key-words | New web-page list (permanent) |

Content Provider's list: This is a list (associated with each key-word) of content providers which must typically [that] pay to illustrate content with the key-word. The price paid is dependent on the number of other content providers, the amount they spend and the number of times the key word is searched for.

| Input data set | Output data set |
| --- | --- |
| Key-word Content Provider's bids for content spots | Content Providers list - a list of content associated with each key-word permanent) |

High-flyers hit-list: This a list of web-pages (associated with every keyword) that are increasing in popularity at the highest rate. It is an indication of how rapidly web-pages are rising up the users' choice hit-list and it is used as a means to ensure that new emerging web-pages rise to the top of the users' choice hit-list.

| Input data set | Output data set |
| --- | --- |
| Old Users' choice hit-list - (temporary) New Users' choice hit-list - (permanent) | High-flyers hit-list: A ranked list of web-pages that are rising in popularity the fastest |

Personal hit-list: This a list of web-pages the individual user has found most useful for each key-word search they have done in the past It is like an automatic book-marking data set for each individual user.

| Input data set | Output data set |
| --- | --- |
| Key-word Individual surfer trace - (permanent) | Personal hit-list: A ranked list of web-pages that an individual has found useful in the past |

Collective Search hit-lists. This can be a combination of any of the above hit-lists. There are many different ways a these hit-lists can be combined.

| Input data set | Output data set |
| --- | --- |
| Crawler hit-list (temporary) Users' choice hit-list (permanent) Advertisers' list (permanent) New web-page list (permanent) High-flyers list (permanent) Personal hit-list (permanent) | Collective Search hit-lists - (Default) Ranked hit-list of Web-pages displayed to the user after the key-word search. It can be a combination of any of the hit-lists above (temporary) |

Crawler key-word list: This is a list of key-word suggestions mat the user may find useful. This is found by matching the key-word entered by the user to the database of key-words and phrases that other users have tied. This is the equivalent of the crawler hit-list, though it is a ranking of key-words rather than Web-page The method for doing this uses a similar olgorithm to a spell-checker only it does it for phrases. It also suggest Key-words, based on previous URL selections from sequences of user key-words.

| Input data set | Output data set |
| --- | --- |
| Key-word (temporary) Database of all key-words used (permanent) | Ranked hit-list of other key-words the user may want to try (temporary) |

Surfer keyword list: This is a data set comprised a list of key-words that the individual user found useful after the key-word was selected. This is found by tracking which key-words the user decided to use. This is equivalent to the surfer trace.

| Input data set | Output data set |
| --- | --- |
| Key-word (temporary) Data about what key words were used from the key-word suggester | Ranked list of other key-words (associated with the key-word) that this individual user found useful (semi-permanent) | key-word suggester: This is a data set consisting of a permanent ranking of other key-words that users have found useful, compiled from successive surfer key-word lists and is linked to each key-word (this is equivalent of the users' choice hit-list).

| Input data set | Output data set |
| --- | --- |
| Surfer key-word list (temp or permanent) Existing users' choice hit list (permanent) | New users' choice key-word list (permanent) |

User Based Search Algorithm

Figure 3A:
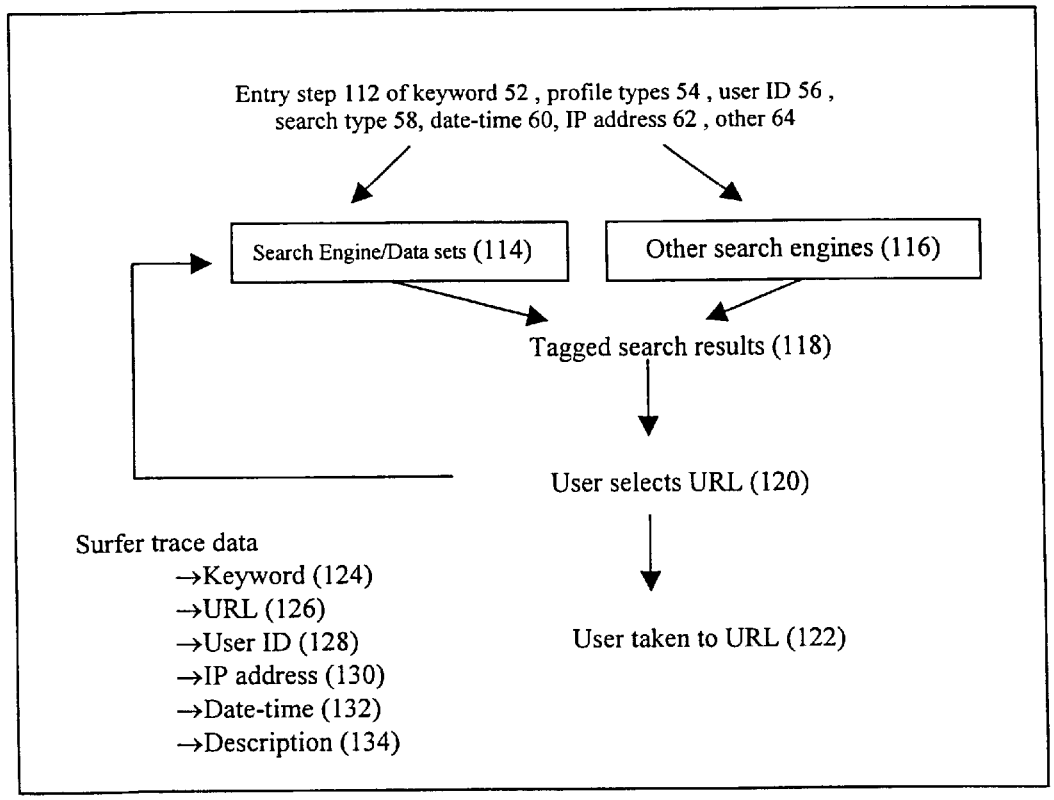
FIGS. 3A and 3B illustrates an overview of the process by which web pages are selected in making up the search results provided to the end user accord to the present invention.
Figure 3B:
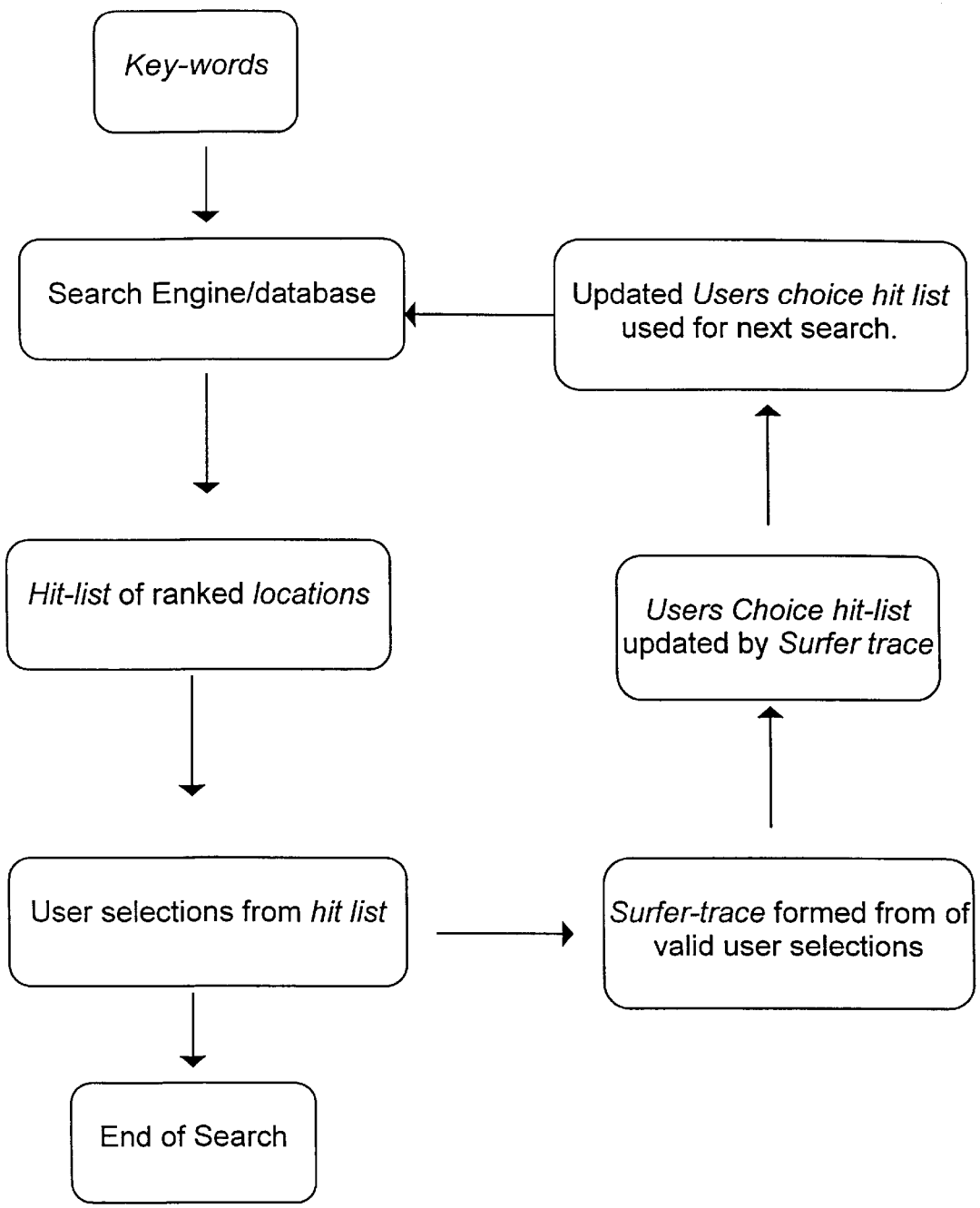

The discussion provided above provides the language necessary to more fully describe the present invention As illustrated in FIGS. 3A and 3B, which provide an overview of the search engine capabilities according to the present invention in which web pages are selected in making up the search results provided to the end user. In step 112, the user enters up to 4 sets of data; keyword 52, profile type 54, search type 58 and User ID 56. The IP address 62 and date-time 60 are not entered by the user but can be read when a user uses the search e . This data is used is used in parallel in steps 114 and 116 to produce list of web pages. Step 114, discussed in detail hereinafter, is the process of selecting web pages from novel new search engine data sets produced in accordance with the present invention. This can run, if desired, in parallel with step 116 which obtains a selection of web pages from other existing search engines. Thereafter, selection of web pages from step 114 and 116 are combined and tagged in step 118. The process of tagging the list of web pages, describe in more detail below, enables a set of data, shown as surer trace data in FIG. 3, to be created and sent back to the search engine when the search engine user selects awe-page from the list in step 120. The process of selecting a tagged web-page creates the following series of data which is used to update the search engine data sets; keyword 124, URL 126, user ID 128, IP address 130, date-time 132, brief web page description 134.

Although it is preferred to use all of these different data types in the surfer the data, use of different combinations of this data is filly within the intended scope of the present invention The description 134 will typically only be included in the preferred embodiment of the invention when anew site is added to the data set 114 of the search engine 10, and the description used will be that description that appears on the original list of web pages. The date-time data 132 may only indicate that a site was selected, rather tm record the period of time a user was at a particular site, as explained further hereinafter. This process is invisible to the user who, upon selecting the web-page from the list of web pages is taken directly to the corresponding URL, step 122. Details of the implementation of steps 114, 118 and 120 will be described in more detail hereinafter.

After the initial selection the user may choose to access another of the web-page URL search results. Depending on the relevance of the site, the user may spend time reading, downloading, exploring further pages, embedded links and so forth, or if the site appears irrelevant/uninteresting, the user may return directly back to the search results after a short period. The time difference between the two selections is recorded as the difference between two date/time data 132 from subsequent selections from the list of web page searches (in this embodiment one can only measure the time spent at one web page if another selection is made after visiting that web page—this then provides another surfer trace 132 which allow a time difference to be calculated). This surfer trace data on the popularity of web pages is used to the subsequent searches, as described further hereinafter.

Thus, according to the present invention, it is the human users' powers of reasoning and analysis that is beg used to establish the relevance of the different results to the subject matter of the search. The present invention utilizes tie cumulative processing and reasoning of all the human users' to provide a vastly more effective means of obtaining the required information sources than is presently possible with the type of method described above As described above, human brain power is captured by recording which web pages the user goes to after each keyword search. According to the present invention, collecting the surfer trace data is achieved by sending, in the list of web pages generated by the search to the user, hidden links that will automatically send information back to the search engine (or a subsidiary server). While the user only sees that his intended link is displayed, the hidden link notifies the search engine of the transfer, which process can be executed with a Java applet. Thus, when the Internet user selects a web-page it takes the user to that address but also sends off the surfer trace data to the search engine 10, which notes what has been selected When the user returns to the list of web pages and selects another web page listing, another Java applet is then executed which creates another surfer trace. The difference between the data time data in this surfer trace from two sequential selections captures the time period that the user has been at the previous web site. This occurs without the use knowing this data is being sent.

In another embodiment, rather than using multiple Java applets to collect a complete list of surfer trace data, there is no description data 134, and the date-time data 132 indicates that a user visited a particular web site. In one specific embodiment, the user must visit a particular web site for greater than a predetermined period of time, such as one minute or fifteen minutes, depending on what is an appropriate time to have looked at the site for the visit to the site to count and for any surfer trace data to be sent back to the search engine 10, as well be described hereinafter. In this embodiment, each applet contains all of the information necessary to update the database at the search engine. Another embodiment collects the surfer trace data prior to a user navigating to the intended web site. Other ways of obtaining this surfer trace data are possible and are within the intended scope of the present invention.

Thus, the search results page according to the present invention is therefore differently formatted from conventional search engines' results pages. The difference is in action rather than content. Visually, the page looks the same to the user as standard search results from other search engines. An example illustrates this point: In a conventional search the results page for a search of the keyword "Weather" may read: 1. www.weather.com Today's weather forecast. Today is expected to be fine ad sunny everywhere.

The HTTP link associated with the "www.weather.com" label is "http:l/www.weather.com". This means that if the user selects this link, they will navigate to this page directly In contrast, according to the present invention, the tagged result page for the search made suing the keyword "Weather" may read 1. www.weather com Today's weather forecast. Today is expected to be fine and sunny everywhere.

The HTTP link associated with the "www.weather.com" label is link.asp?n=1." If the user selects this link, therefore, in a process is invisible to the user, the user is first directed to the link asp page on the site corresponding to the web server using the search engine 10 according to the present invention, and pass parameter n with value 1.

Server side code (application code that runs on the web server) uses this parameter to identify Me URL and description of the user's chosen site, This information is then stored in a database Table along wit other surfer trace data. The server side code then executes a redirect operation to the user's required URL. The user then sees their required page appear.

The source of search results is independent to this activity. The destination page of the user is independent of this activity. The process is one of recording a user keyword and destination into a database. This method of tracking can only record the initial web-page visited after a keyword search. If the user continues to return to the search results list then subsequent web-page visits can be recorded.

The surfer trace data that is sent back to the data sets 114 of the search engine 10 as a result of the user selecting the we-page can be encrypted to prevent fraudulent users from sending fake data to the search engine.

Another method of tracking where a user may connect to from an initial URL selection (if they do not return to the search result page) is to run the selected web-pages as part of a 'frame' located at the search engine web-site. This permits a complete record of the web pages visited to be recorded after a keyword is entered. However, this imposes an additional level of complexity to the system with a possible decrease in system response time.

As previously mentioned, the surfer trace data that can be collected includes keyword 124, URL 126, user ID 128, IP address 130, date-time 132, brief web page description 134, and is identified as such since it provides a trace or record of how searchers (surfers) use the search engine. This data is used to improve future searches building on the preferences of previous searchers. The surfer the is thus a measure of the preferred choices of an individual user or web 'surfers' from the initial search results for a particular set of key-words.

How the Data Sets are Created that Determine the List of Web Pages

Figure 4:
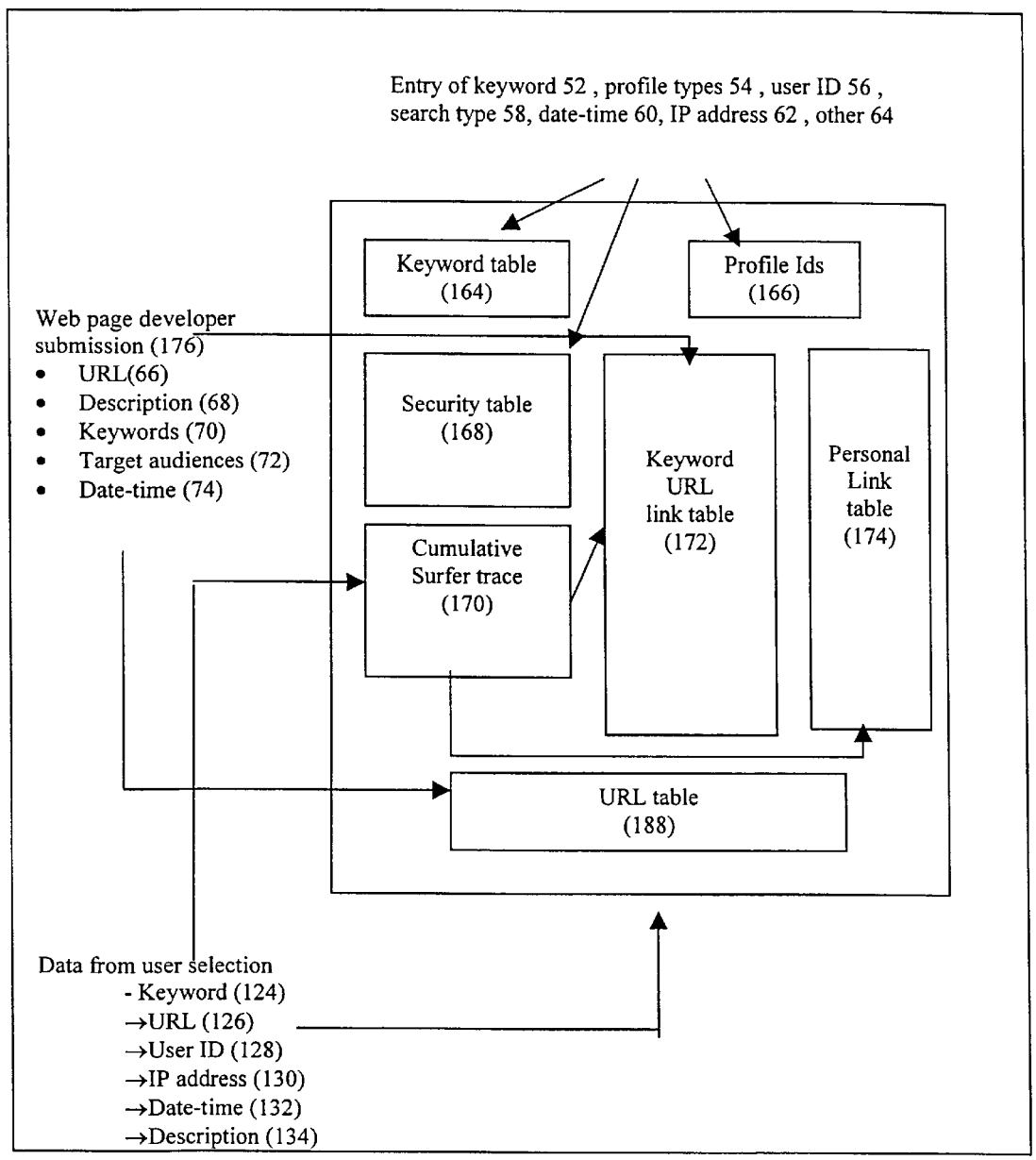
FIG. 4 illustrates the data sets used for different web-page searches according to the present invention.

FIG. 4 illustrates the data sets used for different web-page searches according to the present invention. The data sets (tables) that are used to determine the list if web pages include keyword table 164, profile ID table 166, security table 168, cumulative surfer trace table 170, keyword URL link table 172, personal link table 174, and web-page (URL) table 188.

The structure of the aforementioned data sets are described in more detail hereinafter. The descriptions that follow show the data arranged in a spreadsheet fashion, with multiple values per cell and many blank cells. Illustration in this manner is convenient for explaining the present invention, but is not an efficient storage and retrieval method. As will be apparent to those skilled in the art, a relational database model would be used to implement the data storage according to the, present invention such that there may be multiple fields or Tables involved to store the data and each field will store only one value.

Keyword Table (164)

The contents of keyword data table 164 of FIG. 4 are shown in more detail in Table 1 shown below, and is a list of keywords including phrases, and the number of times they have been requested. If the list becomes unmanageably large, the key-words that are not used again after a predetermined time period could be deleted from the list. However is would be desirable to keep the majority or all keyword phrases that are entered, if possible.

TABLE 1

List of information requests and the number of times it is requests

| Key-word | Cumulative number of times the key-word is requested (W) | Unique number for each key-word |
|---|---|---|
| Key-word 1 | W1, W2, W3 etc | |
| Key-word 2 | | |
| Key-word 3 | | |
| Key-word 4 | | |
| Key-word 5 | | |
| Key-word 6 | | |
| Key-word 7 | | |

The cumulative number of times a keyword is requested may be segregated according to the different "users profiles" selected (W1, W2, W3, . . . ),e.g. W1=total searches, W2=male profile, W3=Female profile, W4=USA profile and so forth. It should be noted that the sum of W's will be greater that the total number of times a site has been visited because the user may fall into more than one profile category e.g. a male-(W2) from the USA (W3). This would become a list of not only the number of user searchers using that key-word but also a list of the type of user (according to the profile type selected) searching for that keyword. Keywords that mean the same thing in different languages are different keywords, as long as the spelling is different, although they could be related using the keyword suggester, as described hereinafter.

Web-page Table (188)

The contents of web-page table 188 of FIG. 4 are shown in more detail in Table 2 shown below, is and contains a list of Internet web-pages. Each web-page has a URL address, an associated 2–3 line description, a unique web page number for each URL(which can also be any character, symbol code or representation) and the cumulative number of times the URL has been visited The URL address will have a unique number (which can also be any character, symbol code or representation) assigned to it rather than storing the full URL string in the subsequent data-Tables.

TABLE 2

List of information suppliers and a description of the web-page

| Address | 2–3 line description | Unique number for each URL address | Frequency the URL (web page) is visited |
|---|---|---|---|
| URL address 1 | | | |
| URL address 2 | | | |
| URL address 3 | | | |
| URL address 4 | | | |
| URL address 5 | | | |
| URL address 6 | | | |
| URL address 7 . . . | | | |

Keyword URL Link Table (172)

The contents of keyword URL lilt table 172 of FIG. 4 are shown in more detail in Table 3 shown below. This table is of particular significance with respect to the present invention because it contain information about the inks between information supplies (URL addresses or web pages) and information requests (Keywords).

This data is recorded in further data sets which describes the relationship between the Key-words and occurrences as defined by the following three parameters.

the cumulative number of significant visits (hits) to each URL addresses corresponding to each key-word (herein referred to as X or weighting factor X). This is a measure of the popularity of the URL for each keyword and is determine from the surfer traces.

the previous cumulative number of significant visits measured at an earlier predetermined instant; (herein referred to as Y or weighting factor Y)

a date time factor relating to the instant of the creation or input of each said web-page(herein referred to as Z or weighting factor Z). Z is the data time in which a web-page developer submitted a web-page to the search engine.

Not all combinations of key-words and URL addresses will have data for X, Y and Z.

TABLE 3

Links between information suppliers (web-pages) and information requests (key-words)

| | Key-word | Key-word | Key-word | Key-word | Key-word |
|---|---|---|---|---|---|
| URL address 1 | X, Y, Z | | | | |
| URL address 2 | | | | | X, Y, Z |
| URL address 3 | | | X, Y, Z | | |
| URL address 4 | X, Y, Z | | | | |
| URL address 5 | | X, Y, Z | | X, Y, Z | |
| URL address 6 | | | | | |
| URL address 7 | | | | | |

Profile Type s with the Keyword URL Link Table

The popularity of web pages will be different for different groups of people. The inclusion of multiple profile type s will produce multiple values of X Y and Z in Table 3, e.g. one may have a Global and New Zealand popularity rating denoted by X1 X2 Y1 Y2 etc.

|  | Keyword "sports" |
|---|---|
| URL address relating to Rugby | X1 = 520, X2 = 52 |
| URL address relating to Basketball | X1 = 4000 X2 = 20 |

In his example the global popularity (using the general profile type) for the Rugby and Basketball URL addresses are 520 and 4000 respectively and 52 and 20 respectively for the New Zealand profile type.

When the general profile type setting is used (ranked based on X1), the Basketball site would be ranked at the top. When the New Zealand setting is chosen (ranked based on X:2) the rugby site would be highest. This would be a reflection of the preferences of the New Zealanders. This is a very simple method of storing the preference of different groups of people. One would expect New Zealand-based rugby web-sites to rate higher than an overseas site on the New Zealand list, but there is no reason that this has to be the case. Someone in Spain may have the best Rugby site in the world. The system evaluates web-pages only on the perceived quality of information by the users—the physical location of the site is immaterial.

There could be a vast range of X values representing different countries, occupations, sex, age and so forth, enabling, the popularity of different groups to be captured very simply. Users could choose to combine any of the X values according to their personal interests/chacterisics.

As an example, if say,

X1 is for males
X2 is for females
X3 is for New Zealanders
X4 is for USA
X5 is for engineers
X6 is or lawyers . . .

A "male" and a "New Zealander" would using the search engine increment both X3 and X1. This facility would increase the data requirement of the system but it could vastly improve the search results for different users. The total popularity of the web-page needs to be stored as a separate number as users may contribute to more than one of the groups of people. The sum of all of the individual popularity's would be greater than the total popularity because user can belong to more than one profile type.

To simplify the system for the user there would be a default profile type (selection of X's) with an option is to use other profile type s to do specific searches. For example, a user may have a default profile type of a New Zealand male, but if a technical search is required a "global engineers" profile type may be chosen that reflects the cumulative search knowledge of engineers around the world.

The extent of personalization could be dependent on the frequency of searching. For example, common keywords such as "news" would have a high degree of personalization (a large range of X values) and less common key-word such as "English stamps" would have little or no personalization (only a global X value). The degree of personalization could be a function of the frequency that the key-word is used (found from Table 1).

Cumulative Surfer Trace Table (170)

The contents of cumulative surfer trace table 170 of FIG. 4 are shown in more detail in Table 4 shown below. Information about the links between web pages and key-words in Table 3 ( also referred to as keyword URL link table 172) is updated by the surfer trace data. The cumulative surfer trace is the combined information from all individual surfer traces and it is used to determine how many "hits" (significant visits) each web-page had for each key-word.

The information collected from each individual surfer trace is a series of inputs previously described, and shown below in Table form

TABLE 4

Each row is one surfer trace and the combined rows are the cumulative surfer trace

| IP Number | User ID | Keyword | URL (webpage) | Date-time |
|---|---|---|---|---|

The way the surfer trace data is processed to update Table 3 is described further hereinafter.

Profile ID Table (166)

The contents of profile ID table 166 of FIG. 4 are shown in more detail in Table 5 shown below. This table includes a unique identification, password, contact email and a default profile type which they normally use to perform their searches.

TABLE 5

User identification Table

| User identification | password | email | Default profile | Other information |
|---|---|---|---|---|
| Joe Bloggs | dogs | jbloggs@AOL | US, Male | |

The users default profile type is stored as the part of the user's personal preferences profile, which would accessed by entering some form of personal identification to the system. This information could be supplied when logging on to the data search engine or the search engine could leave a "cookie", as that term is known in the art, on the computer to identify a user, (there would be an optional e-mail address and password (or similar) associated with the logon procedure). The IP address itself would not be a sufficient means of identification as it is not necessarily unique to the individual users.

The other information can include user defined preferences for how the search results are combined and keywords that are of particular interest to the user. This information can be used to actively customize the search results and suggestions of web pages to visit.

Personal Link Table (174)

The contents of personal link table 174 of FIG. 4 are shown in more detail in Table 6 shown below. Table 6 is identical in structure as Table 3, and can be used to record a users personal preferences relating to each URL including the number of times visited and the key-words. In this Table 6, however, Z is not the date that the web-page developer submitted the web-page by it is the date-time that the user visited the web page. This allow the users could refine a search by defining the last time they visited the web page.

TABLE 6

Links between information suppliers (web-pages) and information requests (key-words) for an individual user

|  | Key-word | Key-word | Key-word | Key-word | Key-word |
|---|---|---|---|---|---|
| URL address 1 | x,y,z | | | | |
| URL address 2 | | | | | x,y,z |

TABLE 6-continued

Links between information suppliers (web-pages) and information requests (key-words) for an individual user

|  | Key-word | Key-word | Key-word | Key-word | Key-word |
|---|---|---|---|---|---|
| URL address 3 |  |  | x,y,z |  |  |
| URL address 4 | x,y,z |  |  |  |  |
| URL address 5 |  | x,y,z |  | x,y,z |  |
| URL address 6 |  |  |  |  |  |
| URL address 7 |  |  |  |  |  |

The data in Table 6 is only accessed by the individual that created it, and accessible using a user ID that is preferably independent of changes in the user's e-mail or IP address changes and would thus enable their past personal preferences to be retained during such changes.

This Table 6 data set could be stored either at the search engine site or on an individual's computer. Storing on local PC's would require additional software to be installed on the users computer. There are numerous advantages to storing the information at the search engine including the fact that users are likely to go there more often and unlikely to change search engines once they have a substantial book mark list.

Security Table (168)

The contents of security table 168 of FIG. 4 are shown in more detail in Table 7 shown below. To ensure that users do not submit the same key-word over and over to increase its popularity the following security data table is used. Each entry is a single piece of information i.e. yes or no. This table can be created for links between keywords and IP addresses or links between keywords and User ID's.

TABLE 7

Security Table to ensure one computer user does not submit keywords to artificially boost the popularity of a web-page

|  | Key-word 1 | Key-word 2 | Key-word 3 | Key-word 4 |
|---|---|---|---|---|
| IP address 1 | 1 |  |  |  |
| IP address 2 |  |  |  | 1 |
| IP address 3 |  |  |  |  |
| IP address 4 |  |  |  | 1 |
| IP address 5 |  | 1 |  |  |

Described hereinafter are the processes that are used by the present invention to populate each of the FIG. 4 tables mentioned previously.

Populating the Keyword Table 164

This table is populated every time a user enters a keyword 52 to the search engine. A submitted keyword is compared to the keyword list in Table 1 (keyword table 164) and added if it is not already present. If it is present, the cumulative number is increased by one. If the user has a profile type then the cumulative number for the keyword for each type of profile will also be incremented (W1,W2 W3 etc).

Populating the Web-page Data Table (URL Table) 188

This table is populated in a number of ways, including:

user selecting a URL address 126 that is not already in Table 2 (URL table 188). The URL address 126 and description 134 are put directly into the web-page data table 188. The new URL is assigned a unique identification number.

in Step 176, as shown in FIG. 4, web-page developers can submit a URL 187 ad description 68 which also goes directly into the web-page data table 188, web crawlers may also add URL addresses and descriptions (the description is either the first few lines of the web-page or in the HTML coded "title"). This is not an essential element of the system but it could be a method to obtain URL's and descriptions. With this search system web crawlers are more likely to be used to verify the information rather than find new information.

Populating the Cumulative Surfer Trace Table 170

The cumulative surfer ace table 170, also referred to above as Table 4, is populated each time a "tagged" web-page is selected by a user. This sends a packet of surfer trace information, such that the surfer trace data is added to the table each time the user selects another web page from a web page list.

Populating the Keyword URL Link Table 172

The data from the cumulative surfer trace 170 is used to update the popularity of web pages as recorded in Table 3 (X, Y), also referred to as the keyword URL link table 172. The frequency of updating Table 3 with the data from the cumulative surfer race (170) to obtain new values of X and Y is a variable that can be changed, from ranges that are shorter than every hour to longer than every month. It should be noted that different keywords can be updated at different intervals of time.

An intermediary step in processing the cumulative surfer trace is to form a cumulative surfer hit table. This is subsequently used to modify the values of and X, Y in Table 3

As mentioned above, the simplest method of recording a link ("useful visit"or "hit") between a keyword and a URL would be to count each keyword, URL paring in a surfer trace as a "hit". A more meaningful and sophisticated method is only to count a location selection as a valid if the user meets certain criteria. This criterion could be the user exceeding a specified time at a location. If this criterion was not met, the selection would not be increase the cumulative value of X in Table 3.

It is also possible to increment the value of X based on the time spent at the web page. The longer the time spent the more this increments the value of X. X does not have to be a whole number.

Due to &he variations in web-site capabilities in terms of log-on times, down loading times, bandwidth, and response times, the predetermined time used to denote a valid 'hit' may be suitably altered. Specialist web crawlers may be employed to independently validate such data.

The selection of a content provider's banner after a keyword search counts as a hit for their web-page (increment the value of X). This will enable their web pages to possibly go up the popularity list associated with the keyword This acts as a mechanism to enable a web-page developer to pay to be seen with a keyword. They can not pay to go up the popularity list—this will only occur if people visit their site and spend time there and record a valid hit for the popular list. The values of a content hit can vary (e.g. if could be 1 or 0.5 or 7) depending on the emphasis one wants to place how much that content affects the popularity ranking.

This cumulative surfer trace information can be processed in a large number of ways to populate Table 8 (below). Grouping the cumulative surfer trace according to the IP addresses or user ID produces the search pattern for an individual users. This is a list of key-words and URLs and times. This allow the time spent at each web-page to be calculated for each user (it is not possible to calculated the time spent at the last web pages of a search session as there is no time record after they go to that web page)

If the time between each visit is longer than a certain time period, one is added to the cumulative surfer hit (α) table for the key-word URL. (this is the simplest method, methods in which relevancy is proportional to the time spent at the site, for example, are also properly within the scope of the present invention).

TABLE 8 cumulative surfer hit table created from accumulated surfer traces

|  | Key-word | Key-word | Key-word | Key-word |
|---|---|---|---|---|
| URL address 1 |  |  |  |  |
| URL address 2 | α |  | α |  |
| URL address 3 |  | α |  | α |
| URL address 4 |  | α |  |  |
| URL address 5 |  |  |  |  |
| URL address 6 |  |  | α |  |
| URL address 7 |  |  |  | α |

The cumulative surfer hit is used to update the value X in Table 3 in the following way $X_{(new)}=(X_{(old)}\cdot HF)+\alpha$.

HF is the history factor which is a umber between 0 and 1. The history factor does not have to be the same for every key-word and could be varied depending on the rate at which the keyword is used The data collected for Table 9 is used to recalculate the values of X in Table 3 after a predetermined time period. The frequency of updating Table 3 will influence the value of the History factor (HF) chosen. The reason for multiplying the existing X by a "history facto" is so that the perceived popularity does not last indefinitely. The history factor reduces the weighting attached to the past popularity. To illustrate by way of an example, the key-word "sports news" may have an existing popularity with the following ranking (based on the number of hits per web-page, X)

| 1 Winter Olympics web-page | X = 19000 |
| 2 Soccer results web-page | X = 18000 |
| 3 Baseball results web-page | X = 15000 |
| 4 Golf news web-page | X = 15000 |

The cumulative surfer hit Table for a week may be:

| 1. Winter Olympics web-page | α = 500 |
| 2. Soccer results web-page | α = 1800 |
| 3. Baseball results web-page | α = 1500 |
| 4. Golf news web-page | α = 4600 |

The reason for the change in the number of hits reflects the fact that the winter Olympics has finished and the Master golf tournament has stated. If one has a "history factor" of 0.9 then the new popularity (X) will be:

| 1 Golf news web-page | 18100 (0.9 × 15000 + 4600) |
| 2 Soccer results web-page | 18000 (0.9 × 18000 + 1800) |
| 3 Winter Olympics web-page | 17600 (0.9 × 19000 + 500) |
| 4 Baseball results web-page | 15000 (0.9 × 15000 + 1500) |

Thus, the more popular web-pages can emerge and the less popular decline, reflecting the fluctuation of interest over time in different subjects and events.

The database is therefor utilizing the human mind to provide a powerful indication of what people find useful on the Internet. The users themselves replace a substantial computation requirement that would otherwise be required to filter through such searches.

The value of Y in Table 3 is the old value of X, and the value of Y will be updated at intervals that are deemed appropriate, which interval could be minutes, hours, days, weeks or longer. The update interval does not need to be the same for all different keywords, as previously mentioned. This is used to calculate the rate of change of popularity of web pages and can be used as a selection criteria.

Different Profile Type s in the Web-page/URL link Table

The cumulative surfer trace includes information on users profiles so Table 8 can be calculated with subscripted values of α for different profile types. These values of $\alpha_{13}$ $\alpha_2$ $\alpha_3$ etc would correspond to the profile types for the subscripted values of X. This allows the popularity of different groups of people to be recorded.

New Web-page Data input to the Web-page/URL Link Table 172

The simplest method of having new pages recorded by the search engines is for web-page developers to submit information, shown as action 176 in FIG. 4, which information includes URL 66, key-words 70, site descriptions 68, target audience 72 and date-tie 74, each time they create or update a web-page.

This information directly updates Tables 2 (URL table 188 of FIG. 4) and 3 (Keyword URL link table 172 of FIG. 4). The URL 66 and description 68 are entered in Table 2 and the date-time (74) at which the page is submitted (the Z value) is inserted in Table 3 for each of the keywords (70). Users are allowed a set number of keywords 70 with which they can submit their web page. An example of what Table 3 would look like with just Z values is given below (format dd-mm-yy).

TABLE 9

Data Table created from submission by web developers

|  | Key-word | Key-word | Key-word | Key-word | Key-word | Key-word |
|---|---|---|---|---|---|---|
| URL address | 27/02/98 |  | 27/02/98 |  |  |  |
| URL address | 28/02/98 | 28/02/98 |  | 28/02/98 |  |  |
| URL address |  |  |  |  |  |  |
| URL address |  |  | 18/02/98 |  | 18/02/98 | 18/02/98 |
| URL address |  |  |  |  |  |  |
| URL address |  |  |  | 28/02/98 |  |  |
| URL address |  | 29/02/98 |  |  |  |  |

If there is no date for the combination of the URL and keyword in Table 3, then the new date is automatically inserted. If a date already exists in the Table, then the dates are compared and if the dates are too close, i,e. less than a pre-determined period, then the old date remains and the new date is ignored. This stops people from constantly resubmitting to get on the top of the new web page list by resubmitting their web pages. If the URL in Table 3 has other keywords with values of Z closer than the pre-determined period then the submission is also not allowed. This stops web-page developers from resubmitting their web pages with different sets of keywords.

When users submit a URL they could target it at specific types of users (different profile type s Z1, Z2, Z3 etc) as per Table 3. For example, an URL submission specifically targeted at New Zealanders (e.g. Z1) will appear at the top of keyword new list when New Zealanders search for that keyword. It will remain at the top until someone else submits a URL for that keyword targeted at New Zealanders. URL's that are targeted at other audiences will not appear as new sites for New Zealanders or alternatively they will not feature as high in the new list as the ones specifically targeted at New Zealanders.

The data on new web pages does not necessarily have to be entered by web-page developers. It could be automated by having a web document template that automatically submits data to the search engine whenever the information on the web-page has been significantly changed. It would prompt the web-page developer to change any key-words as appropriate.

Another embodiment requires sending specialist crawlers out to find web site addresses and key-words, though this has many of the drawbacks of existing web-crawlers. It could only be effective if web designers deliberately configured their page with the key-words identified. Any web site designer/proprietor willing to do this would also presumably be willing to submit any updates to the search engine to benefit from the instantaneous listing on the search results.

An extension of this principle is to auto-detect if a web address possessed key-word information in the database and then automatically send an invitation to provide the information to enable their web-page to be found easily. The ideal number of key-words to be submitted with each web-page is preferably less than 50 and probably preferable within the range of about 5 and 20. This also advantageously forces web-site designers to find the most appropriate keywords to describe their site and also enable them to choose the audience they wish to target.

The web-page submission process may also include web-page developer identification process that restricts the ability of people to use the system fraudulently. This may include a payment to prevent multiple web-page submissions.

Populating the Profile ID Table 166

ID table 166 of FIG. 4 is populated from the direct inputs from users. When users search the can choose their profile type 54 from a layered drop down menu, which could include, for example:

Gender (Male or Female)

Occupation (Professional, student etc)

Age category etc

The user selects different profile types from the options they are prompted if they wish to save this as their default profile type. This is then recorded in Table 5 (profile ID's table 166). The user may also select personalization options from a specific personalization options page rather than a drop down menu on the search page.

Populating the Personal Link Table 174

The cumulative surfer trace is used to identify the search patterns of individual user based of sorting by User ID 126. This information is used to update the personal link table 174 in the same way that the cumulative surfer trace 170 is used to update Table 3 (keyword URL link table 172). This table stores users past preferences as a form of automatic book marking.

Populating the Security Table 168

Each time a user enters a keyword 52 into the search engine it updates the security table 168 (Table 7) by making a link between the keyword 52 and the IP address 62 (or making a link between the keyword 52 and the User ID 56). The data in Table 7 is cleared periodically as the purpose is to stop systematic repeat searching from affecting the popularity lists (value of X in Table 3) rather than stopping individuals who occasionally perform the a repeat keyword search from affecting the popularity list.

Determining the List of Web pages

Figure 5:
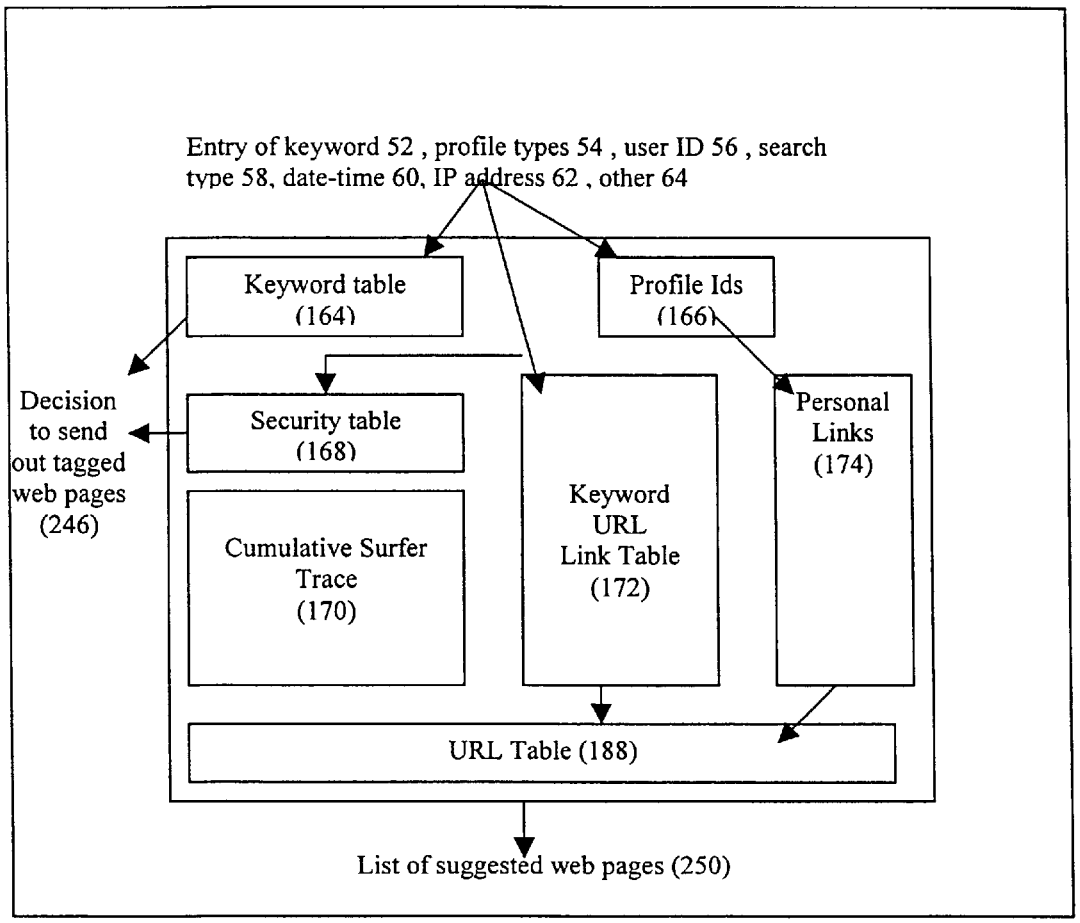
FIG. 5 shows e various data sets previously describe and various inputs and actions that result in a list of suggested web pages being provided according to the present invention.

FIG. 5 shows the various data sets previously described, and various inputs and actions that result in a list of suggested web pages being provided, and will be described in more detail hereafter. As shown in FIG. 5, user data entered into the search engine can include: keyword 52, user ID 56, search type 58, IP address 62, profile types 54. How this data can be used to determine a list of web pages 250 as well and deciding which of the list of web pages to tag (step 118 of FIGS. 3) for the purposes of creating a surfer trace is described hereinafter.

The numbers (X, Y and Z) in Table 3, which correspond to keyword URL link table 172 in FIG. 5 contain all the information required to give the following types of searches 58:

Popular-list search ranked hit-list of the most popular URLs for that keyword based on the number X Hot off the press search ranked hit-list of newest URLs for the keyword based on the date/time (Z)

High-flyers search ranked hit-list of best emerging URLs based the difference between X and Y Random search hit-list that is a random sample of URLs that have any of the numbers X, Y or Z Date created search this is hit-list based on the date time Z and the user-specified date of interest (not just the newest)

The personal link table 174 also allows past preferences to be listed as search results Previous favorites search is a ranked hit-list base on the previous popularity for the individual (X from Table 6). This search is based only on the previous searching of the individual user. This allows the users to very quickly find site that they have previously visited.

A number of other search options are also available.

Conventional search is We list of search results from a normal search engine (116 FIG. 3)

Other content only search. This is a list of other content, such as advisements, associated with the key-word.

These search results can be combined in a number of different ways

Collective search ranked hit-list that is a collection of any of the search hit-lists described above (this is the default set of search results)

Customized search ranked hit-list that can be a user defined combination of any of the above lists.

FIG. 5 also illustrates the use of keyword tibia 164 and security table 168 in a decision 246 to send out tagged web pages. This decision is based upon the frequency of key word usage, the data in the security table and the presence of a user identification. The details of the decision to send out tagged web pages is described fully in FIG. 16.

How the Different Types of Search Lists are Implemented

More details on how each of these types of searches is implemented is provided below along with some of the advantage and disadvantages of each. The system relies on the brain power of the user, this time to determine what sort of search they want to do which will depend on what they want to find. The search methods are described easily so users should intuitively know which one to use.

Popular Search

Figure 6:
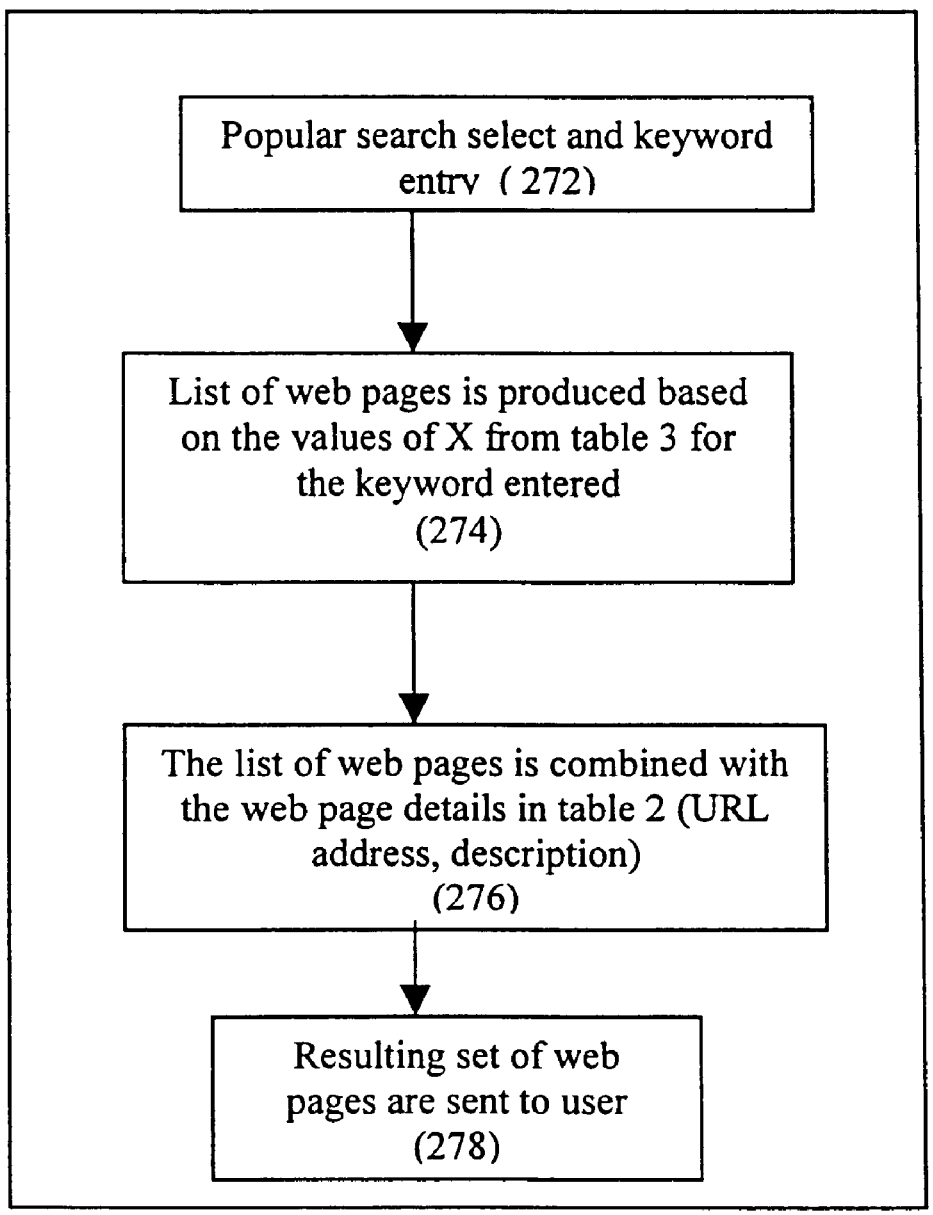
FIG. 6 illustrates the implementation of a popular search according to the present invention.

FIG. 6 illustrates the process for determining a list of popular web pages associated with the entry of a keyword 270 in step 272. If this search is selected and a keyword is entered, step 274 follows and produces a list of web pages based on the values of X taken from Table 3 (172, FIG. 5) for the keyword 270 entered. These web pages are identified by a unique web-page(URL) number from Table 3. Thereafter, in step 276 the list of web-page numbers found from step 274 is combined with the URL address and web-page description from Table 2 (188 FIG. 5). In step 278 the resulting list of web pages is then tagged, depending on the results of step 246 in FIG. 5 as described previously, and sent to the user for them to make their selections. Hot off the press search.

Figure 7:
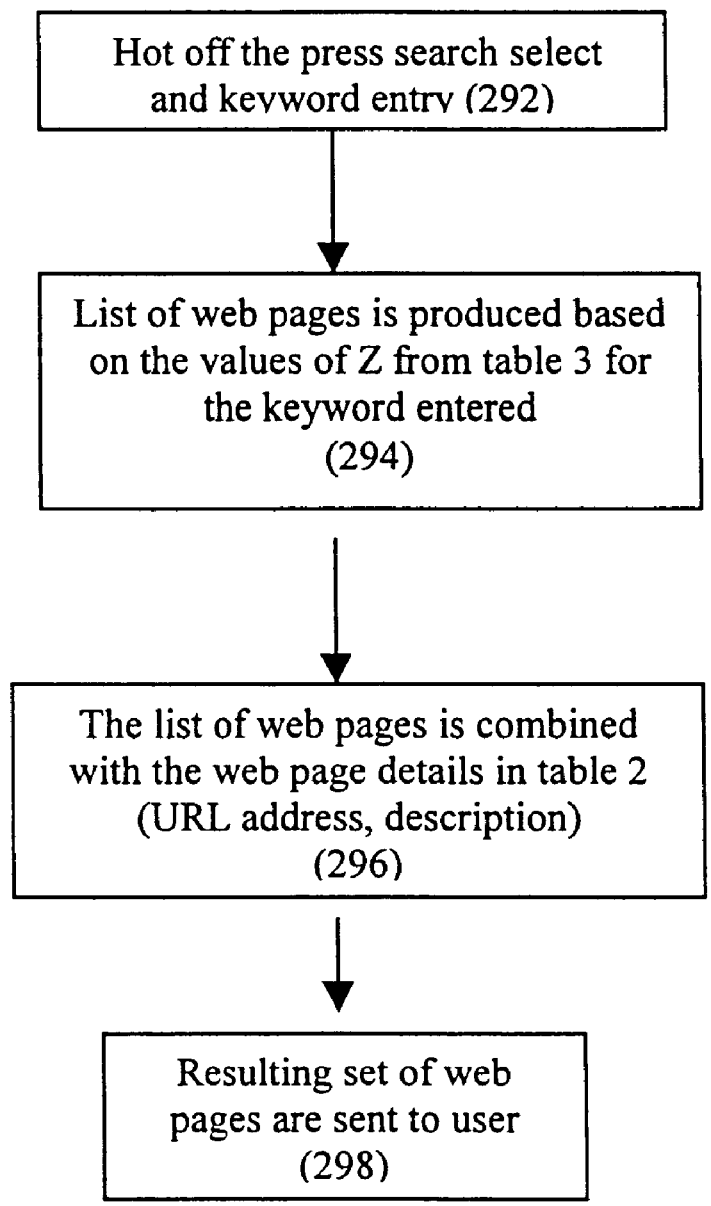
FIG. 7 illustrates the implementation of a hot off the press search according to the present invention.

FIG. 7 illustrates the process for determining a list of new web pages associated with the keyword entered in step 290. If this search is selected and a keyword is entered, step 294 follows and produces a list of web pages based on the values of Z taken from Table 3 (keyword URL link table 172 of FIG. 5) for the keyword entered in step 290. These web pages are identified by a unique web-page (URL) number from Table 3. Thereafter, in step 296 the list of web-page numbers found from step 294 is combined with the URL address and web-page description from Table 2 (URL table 188 of FIG. 5). In step 298 the resulting list of web pages is then tagged depending on the results of step 246 in FIG. 5 as described previously, and sent to the user for them to make their selections.

The user will also be able to see exactly when each web-page was submitted so Internet users can be aware of its currency. An indirect consequence of this feature is the incentive for web designers to update their sites. The prominence given to new and updated sites provides a means of becoming established on the popular hit-list and encourages the use of appropriate key-words and rewards the up keeping of web pages that users find useful.

High-flyers Search

Figure 8:
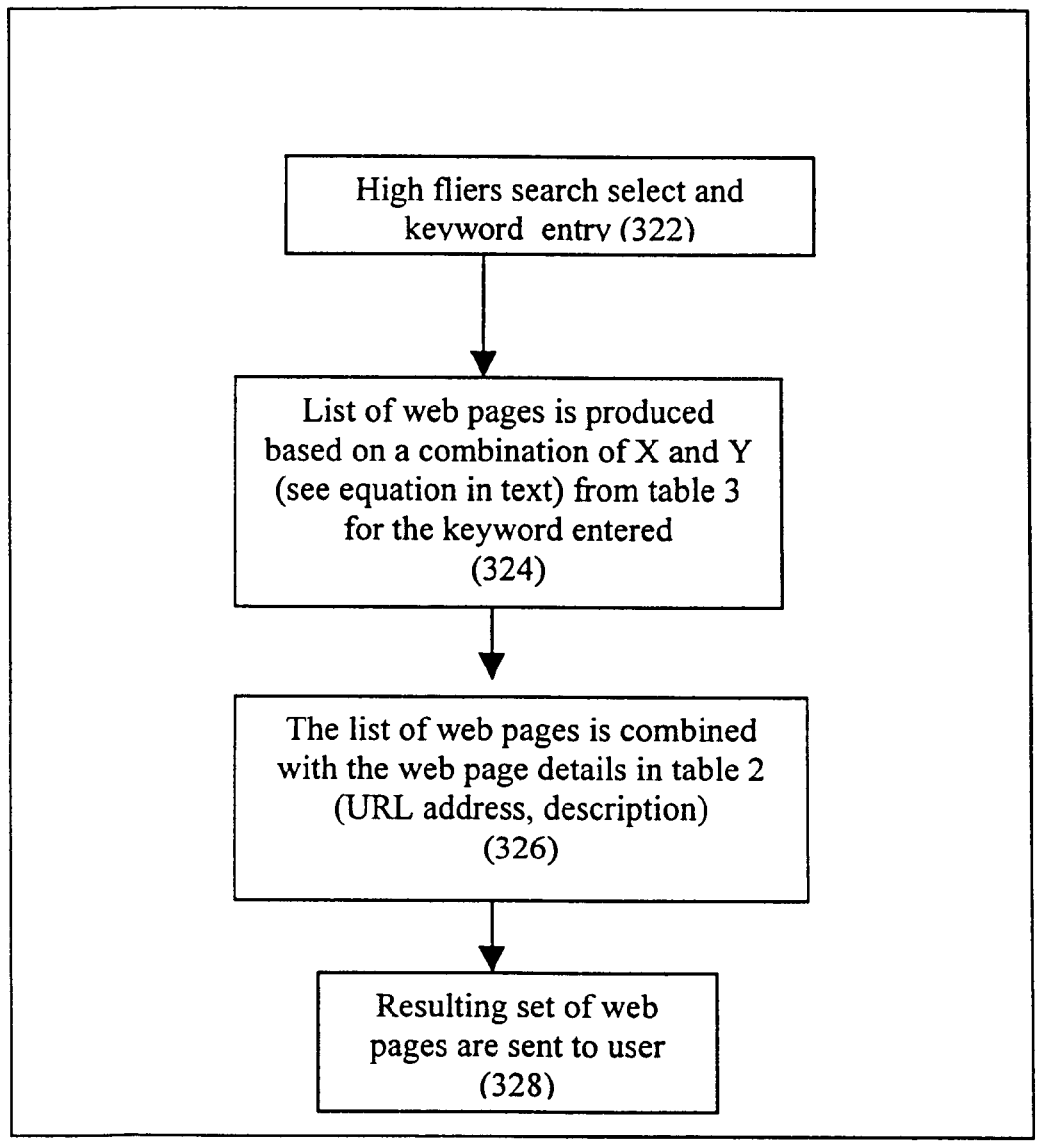
FIG. 8 illustrates the implementation of a high-flyers search according to the present invention.

FIG. 8 illustrates a high-flying web pages search associated with the keyword entered in step 320. This is a list of web pages that ate increasing in popularity fastest. If this search is selected and a keyword is entered, step 324 follows and produces a list of web pages based on the relationship between the values X and Y taken from Table 3 (172, FIG. 5) for the keyword 320 entered. These web pages are identified by a unique web-page (URL) number from Table 3. Thereafter, in step 326 the list of web-page numbers found from step 324 is combined with the URL address and web-page description from Table 2 (188 FIG. 5). In step 328 the resulting list of web pages is then tagged depending on the results of step 246 in FIG. 5 and sent to the user for them to make their selection.

The high-flyer list is calculated by comparing the old popular ranking (Y) and the new popular ranking (X) from Table 3. From this the percentage increase in hits is calculated. An alternative method would be to rank the rate of change of popularity by the number of places they rose compared to last time.

The formula of calculating the rate of change of popularity for this embodiment is given by:

$$((X-Y).(X/(X_m\beta)))$$

where $X_m$ is the maximum value of X for the corresponding key-words and $\beta$ is an additional variable that can be changed to alter the relative significance of changes at the top and bottom of the popularity list.

The reason for multiplying by the maximum value of X is to ensure that small changes at the lower popularity levels do not swamp more significant changes higher up the table. For example, a web site having previously recorded only one selection and then attracting 5 hits the next day would exhibit percentage increase of 500% whilst another web-page may have experienced an increase from 520 hits to 4000 hits (a much more significant increase) though this would otherwise appear as a lower percentage increase.

Random Search

Figure 9:
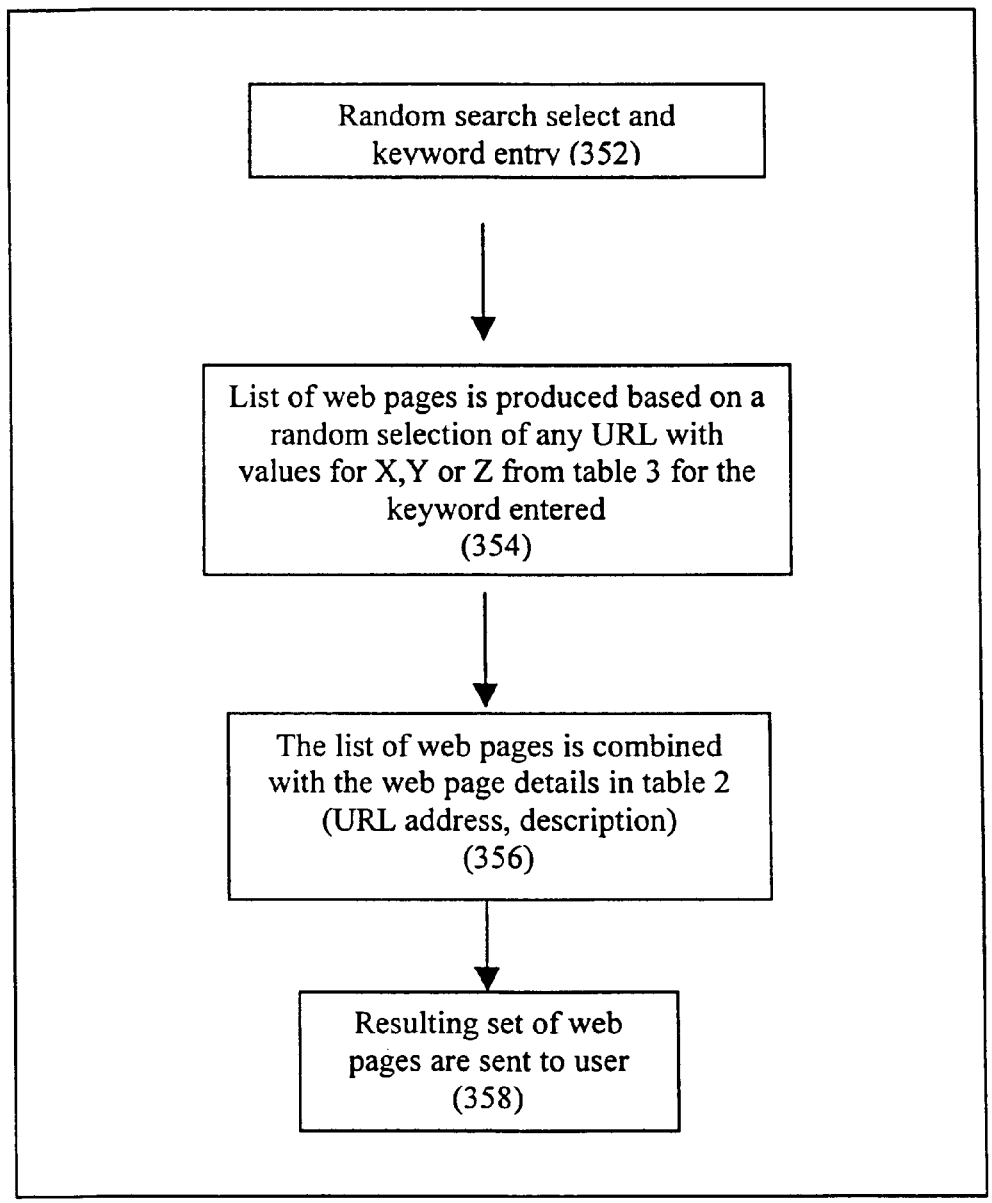
FIG. 9 illustrates the implementation of a random search according to the present invention.

This is a random selection of less-popular web-pages for the user that want to look at web-pages off the beaten track, based upon a random selection of web pages that has any value of X, Y, and Z associated with a keyword that is entered. Accordingly, after a user enters a keyword in step 352 as indicated in FIG. 9, reference is made to the keyword URL link table 172 illustrated in FIG. 5, and a random list of web pages numbers are generated automatically using a random number generator are determined, as illustrated at stop 354. Only web pages that have values for X, Y or Z associated with the key word are chosen in this random selection as this indicates that at some stage in the past as used or web page developer thought the web page had some connection to the keyword. Thereafter, in step 356 the list of web-page numbers found from step 354 is combined with the URL address and web-page description from Table 2 (188 FIG. 5). In step 358 the resulting list of web pages is then tagged, depending on the results of step 246 in FIG. 5 as described previously, and sent to the user for them to make their selections.

Conventional Search

This is the normal search method of a conventional search engine, referenced as other search engine 116 in FIG. 3, which may or may not be included along with the searches according to the present invention, at the option of the user, as noted previously.

Content Only Search

This is a list of content, such as advertisements, associated wit the key-word, which the user cannot control. The ones that have paid the most will be at the top of the list, as described further hereinafter, in accordance with the preferred embodiment of the invention. Of course, other systems for identifying the order of paying content providers can also me implemented.

Previous Favorites Search

Figure 10:
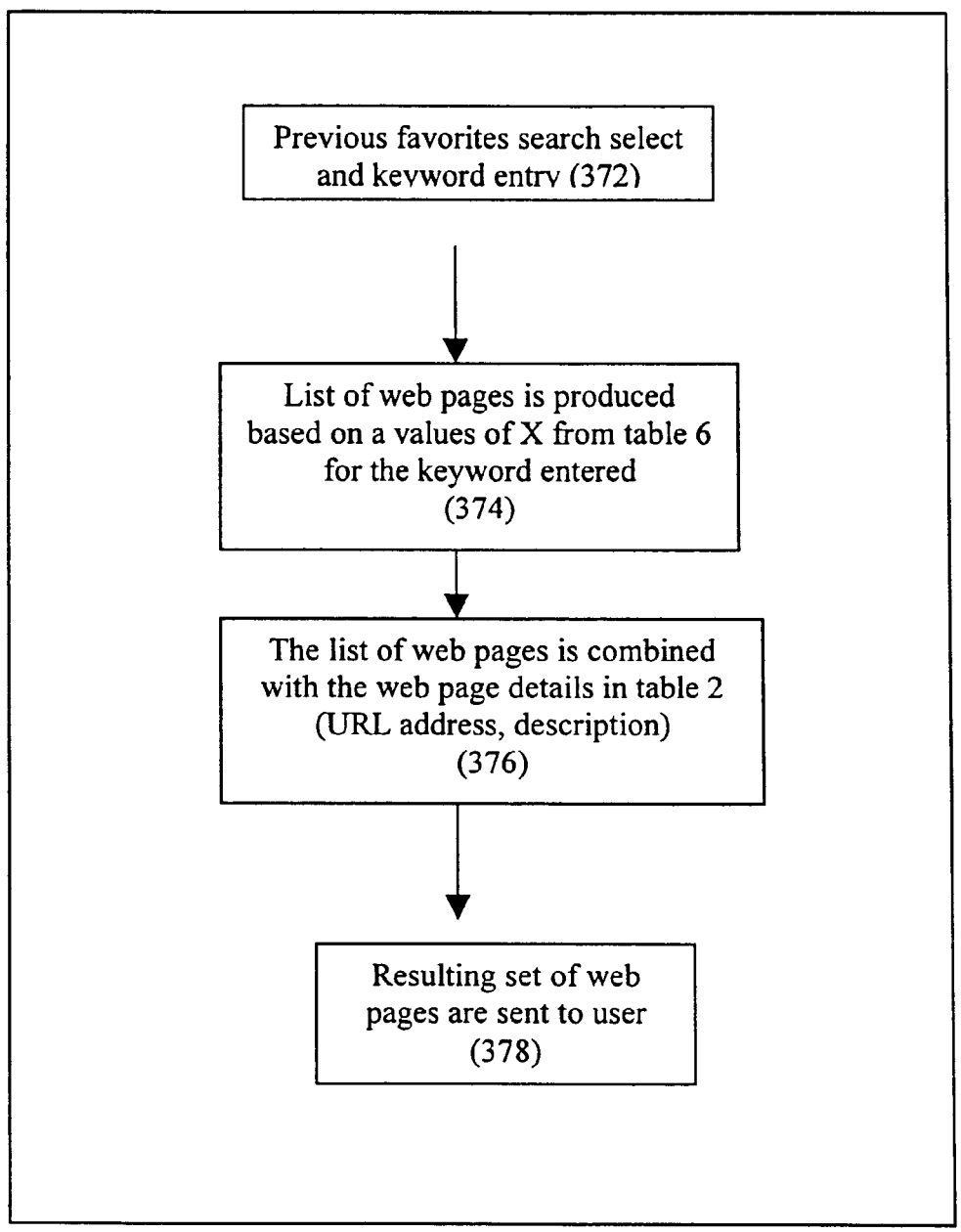
FIG. 10 illustrates the implementation of a previous past favorites search according to the present invention.

FIG. 10 illustrates a previous past favorites search, that is based only on the previous searching of the individual user. This allows the users to very quickly find sites that they have previously visited and performs, therefore, automatic book marking. It should be noted that since a password is preferably used to logon to the search engine system according to the present invention, the user will be able to access their personal preferences from any computer.

Thus, when the user types in a keyword at step 372 as indicated in FIG. 10, step 374 follows during which it is determined what are the favorite sites (based on previous usage) for that keyword from the personal link table 174 illustrated in FIG. 5. Because the user has a password that can be used to logon to the system the user will thus be able to access their personal preferences form from any computer.

Due to this search capability there is, therefore, no need to manually bookmark web pages. If a user forgot to book-mark a good site on, for example, 'marbles', they can easily find it by retyping the keyword that lead them to that site. If a user's preferences change they will be reflected in the personal links table 174.

Another embodiment of the personal preference search includes specifying the date the web page was list visited, with or without using a keyword. The web pages are then ranked based on Z in personal links table 174 of FIG. 5. For example if a user looked at a site in the middle of last year the user can refine the search by date, thus making it easier to find a previously useful web-pages more easily, even if they could not remember the relevant keyword This automatic book-marking feature can also act as a device for monitoring the type of Internet use being undertaken by a particular computer and thus for example, can provide warning to parents/employers of children/employees accessing undesirable sites, such as adult web-pages. In a preferred embodiment, for parents/employers unlikely to use the computer themselves, notification of such usage is automatically provided by letter to the parent/employer that lists the keywords selected and web pages visited by the children/employees. This information is found directly from each user table 174 of FIG. 5.This requires a user identification code that also included parental/employee information.

Collective Search

Figure 11:
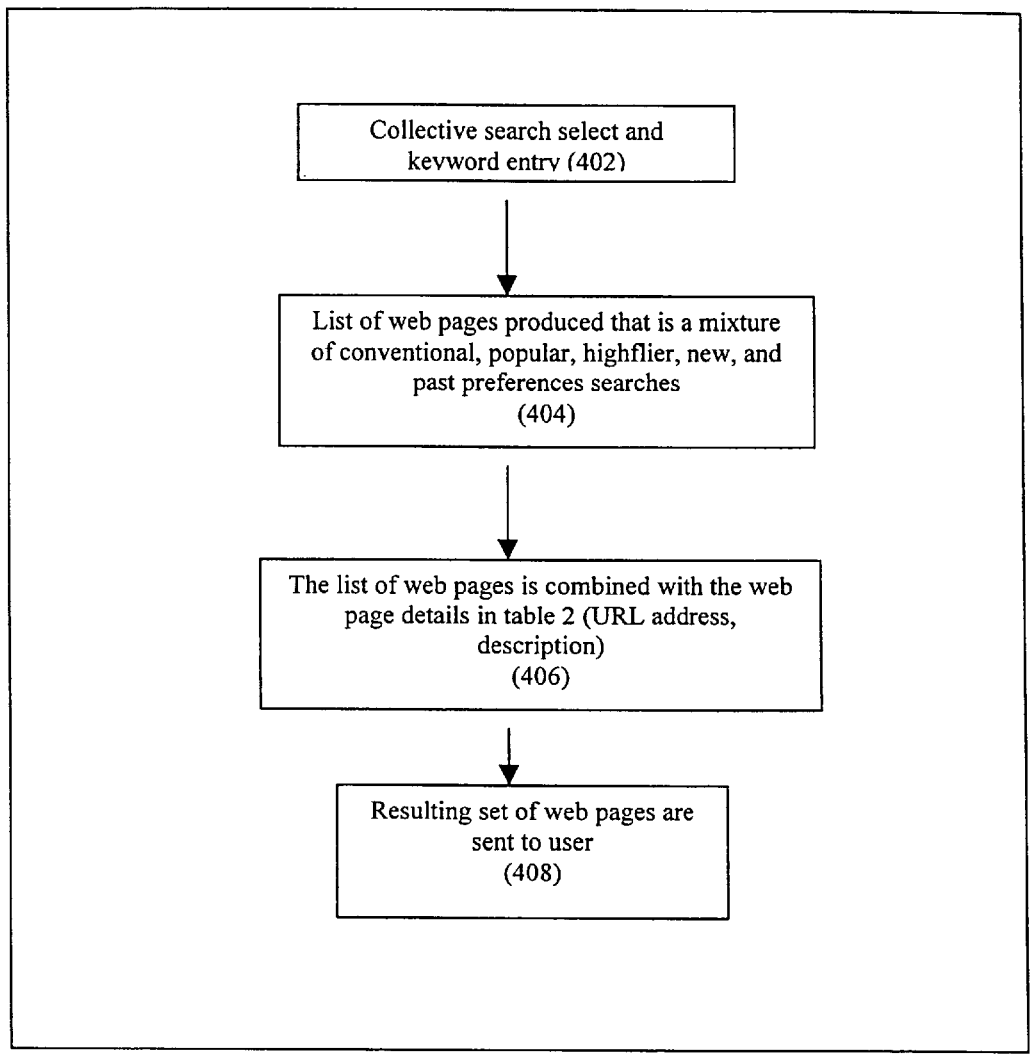
FIG. 11 illustrates the implementation of a collective search according to the present invention.

The collective search, as illustrated in FIG. 11, is the default search according to the present invention and is used when the user does not actively choose on of the other search options.

Upon entry of a keyword in step 402, that keyword is used to select from a combination of web page selections associated with that keyword. A shown, for example, in step 404, an equally weighted combination of conventional, popular, highflier, new and past search results is used to obtain a list of web page numbers. Thereafter, in step 406 the list of web-page numbers found from step 404 is combined with the URL address and web-page description from Table 2 (188 FIG. 5). In step 408 the resulting list of web pages is then tagged, depending on the results of step 246 in FIG. 5 as described previously, and sent to the user for them to make their selections. the system is first configured, the search engine 10 database will not posses any information on popular, high flyers and new web page hit-lists, so search results will initially be obtained from the conventional hit-list (normal search engine), and the tagged web pages then used to create the database sets as have been described. As the system develops, the data sets associated with each of the other search types will become populated, and searches using the other search types will become more useful.

Date Created Search

Figure 12:
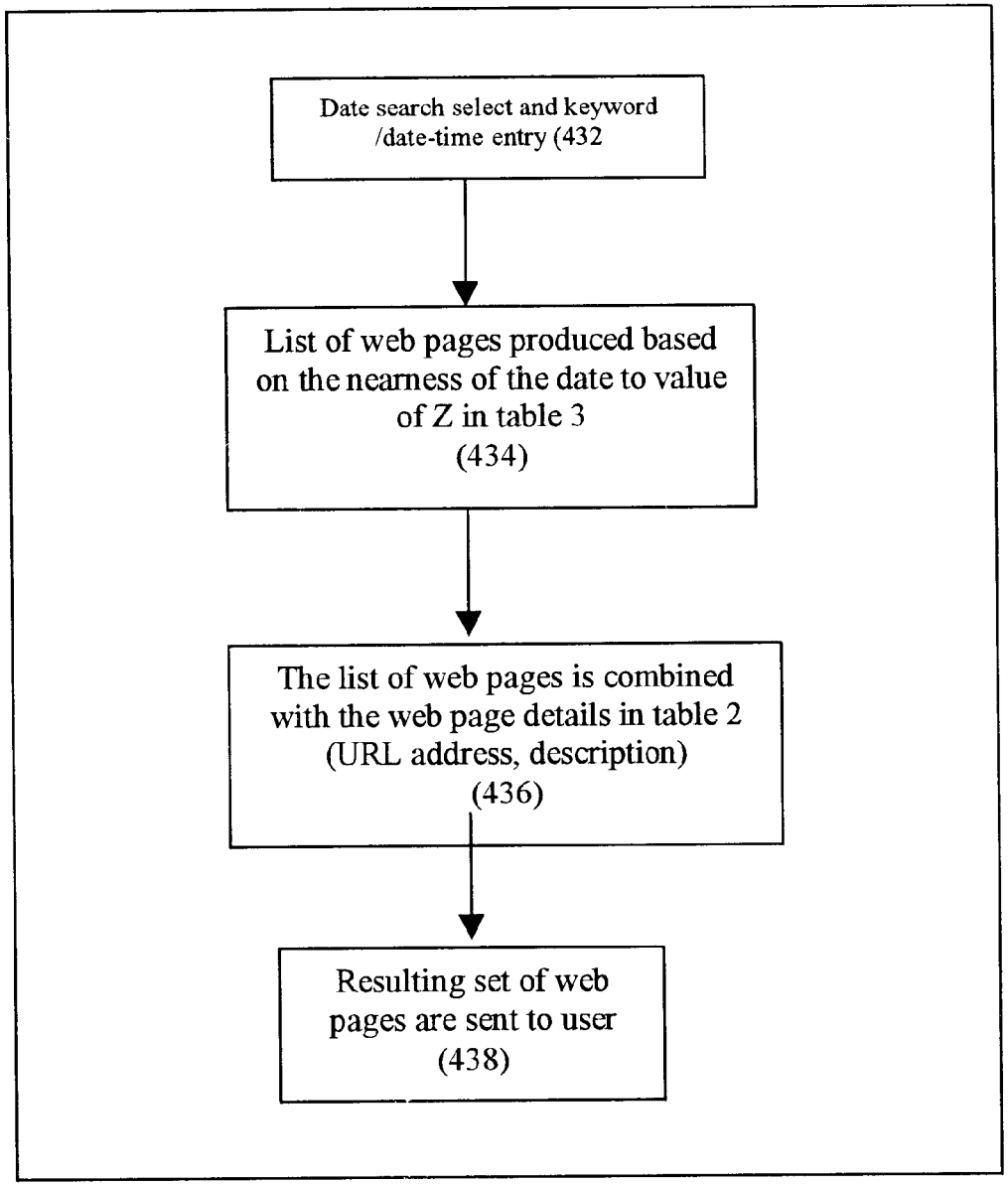
FIG. 12 illustrates the implementation of a date created search according to the present invention.

FIG. 12 illustrates a date created search at allows the user to select the date that the web-page was submitted. This feature will only work for web-pages that contain a date created data entry, identified as date-time submission 74 in FIG. 4. Upon entry of a date-time and/or a keyword in step 432, the search engine 10 will perform step 434 in which a list of web page numbers associated with these variables is obtained Thereafter, in step 436 the list of web-page numbers found from step 404 is combined with the URL address and web-page description from Table 2 (188 FIG. 5). In step 438 the resulting lit of web pages is then tagged, depending on the results of step 246 in FIG. 5 as described previously, and sent to the user for them to make their selections.

Customized Search

Figure 13:
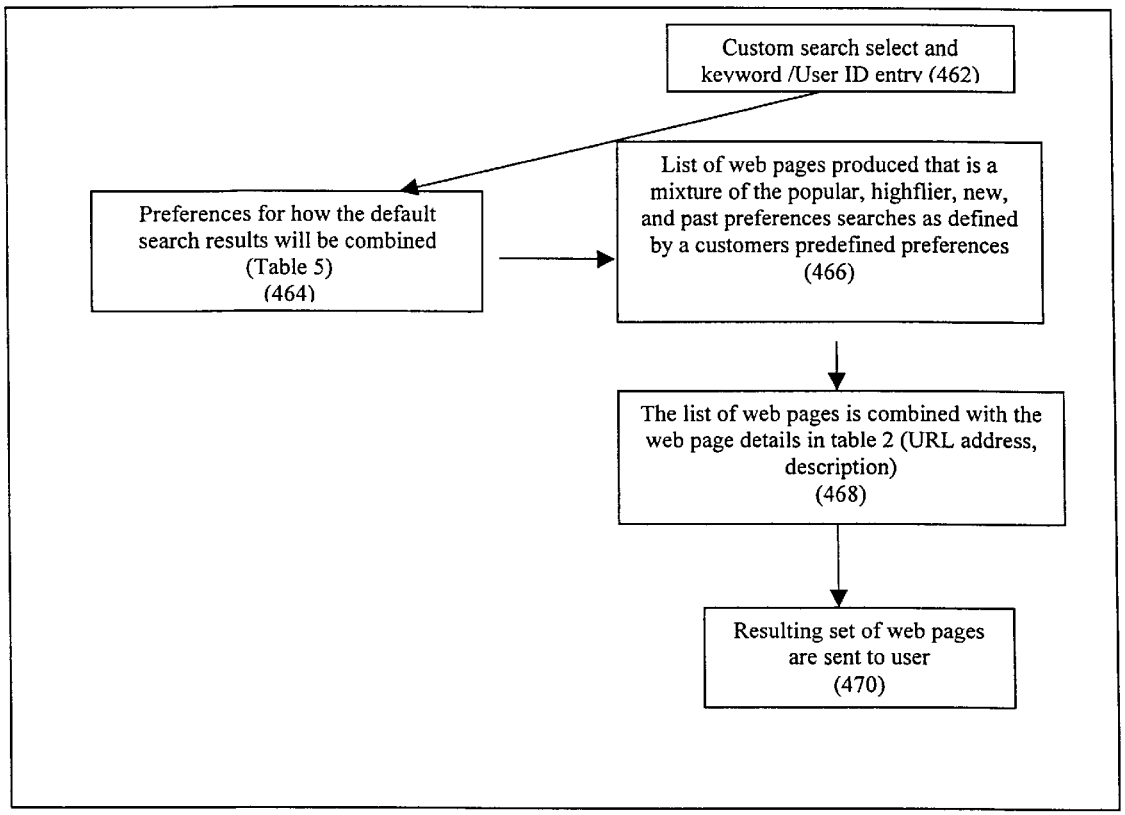
FIG. 13 illustrates the implementation of a customized search according to the present invention.

FIG. 13 illustrates a customized search that allows the user to decide how they want their default hit-list to appear. In step 462, the keyword and User ID is selected in order to initiate the customized search. Prior to initiating the customized search in step 466, which step is identical to step 404 of the collective search previously described with respect to FIG. 1, however, step 464 is applied to customize the users default mixture of hit-lists For example a user may want their default search results to include only popular and new web pages but no high flying web pages. This custom search is then performed in step 466 to generate a list of web page numbers. Thereafter, in step 468 the list of web-page numbers found from step 466 is combined with the URL address and web-page description from Table 2 (188 FIG. 5). In step 470 the resulting list of web pages is then tagged, depending on the results of step 246 in FIG. 5 as described previously, and sent to the user for them to make their selections. one preferred embodiment, the make-up of the default search results list can be amended by 'learning' from the use's behavior to create a changing customized search based on the user's own search patterns. If a user consistently chooses new web pages or high-flying web pages for example, ten their set of default search results will be changed to reflect their normal search style.

Magazine Search

The magazine search according to the present invention enables users to search by following a series of menu-driven subject choices (or similar hierarchical structure), rather than entering a specific key-word(s).

Existing magazine-style search engines require editors to set the structure of information, decide on its relevant merits and set the criteria, such as price, for space on a given page transmitted to the user/viewer. Using the search system of the present invention, the users' themselves dynamically decide what is and is not worth seeing. Thus, although editorial input is needed regarding a hierarchy of subjects, the web-pages that emerge as the most popular for each of these subjects will evolve automatically.

Use of Data Sets for Different Groups of People

Figure 14:
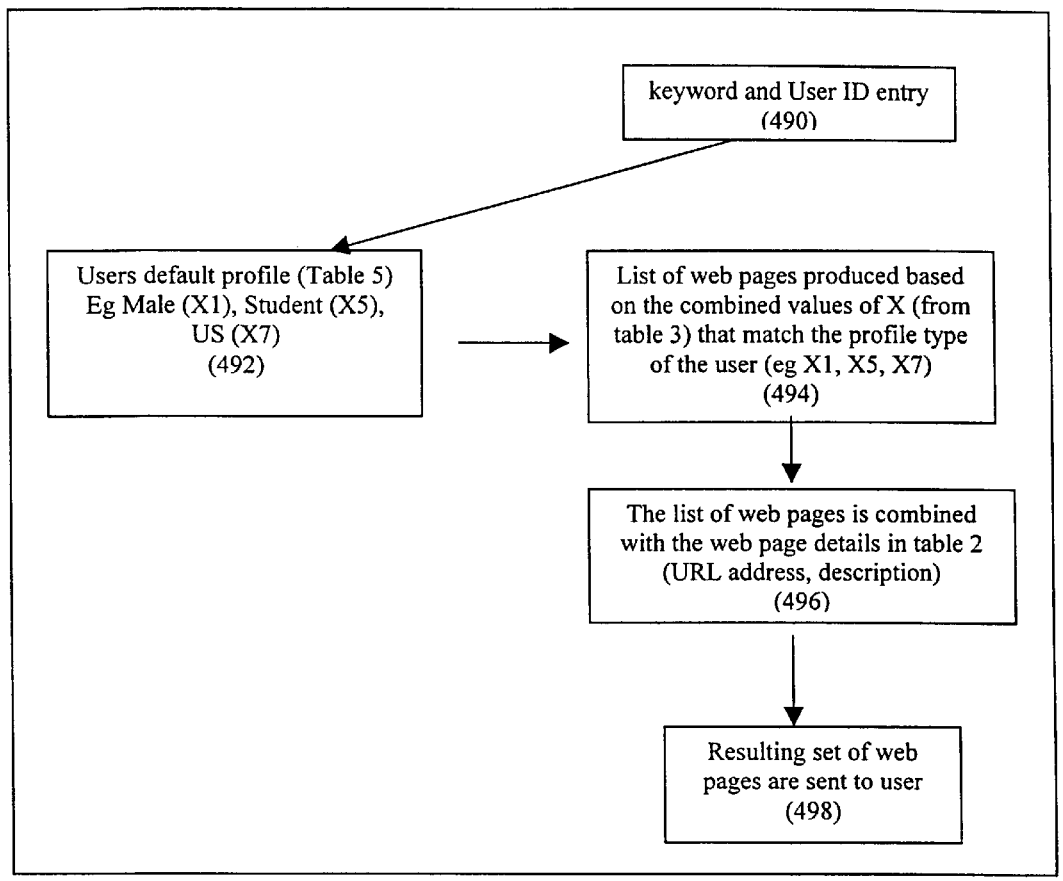
FIG. 14 illustrates the implementation searching based upon a group identity according to the present invention.

Different popular hit-lists may be employed to provide results which would reflect different cultural, geographical, professional, gender or age interests. Thus, as shown in FIG. 14, when a user enters a keyword and User ID in step 490, the default profile of the user can be used to reflect the type of web pages that people of the same "group" as the user profiles desire to see. Thus, the search that takes place in step 494 is based on the subscripted X, Y and Z values obtained from the default profile of people of those "group" affiliations identified in the user's personal profile obtained in step 492. Thus, the rather than an overall global search result, search results are obtained particularized for the group that the user identifies with. The resulting list of web pages, derived from steps 496 and 498, as have been previously described, are particularized for that group.

Thus, for a particular user with the profile type New Zealand selected as a geographical factor, a search for team field sports and related key-words, rugby material might figure prominently, whereas an American profile type may produce a bias towards baseball/American football material, for example. This technique offers the ability to discriminate between the different meanings of the same words, according to the context of the popular hit-list associated with a particular profile type. A general search using a key-word 'accommodation' for example would include results related to housing, renting and similar whereas if the user indicated an interest in optometry in their profile type, then the term 'accommodation' would be interpreted quite differently.

The relevance of such sites will evolve automatically, without any active evaluation of the sites by the search engine operator or the user. There are no complex olgorithm required to analyze the relevance of web-sites for particular types of users. Instead, the type of site deemed relevant will be decided by those users selecting those characteristics for their profile type , i.e. American females interested in rock-climbing. Sites of greater relevance will naturally attract more hits, increasing their ranking and thus increasing the chance of a subsequent user also investigating the site. In the above example, any web sites listed for the keyword 'accomodation' which were unrelated to optometry, sight, lens, vision, etc., would not be accessed for the period of time required to make a valid it. It would therefore receive a very low ranking and hence be even less likely to be accessed by Her users.

The user can select different profile types for different searches during a single session and is not be restricted to the default profile types.

Figure 15:
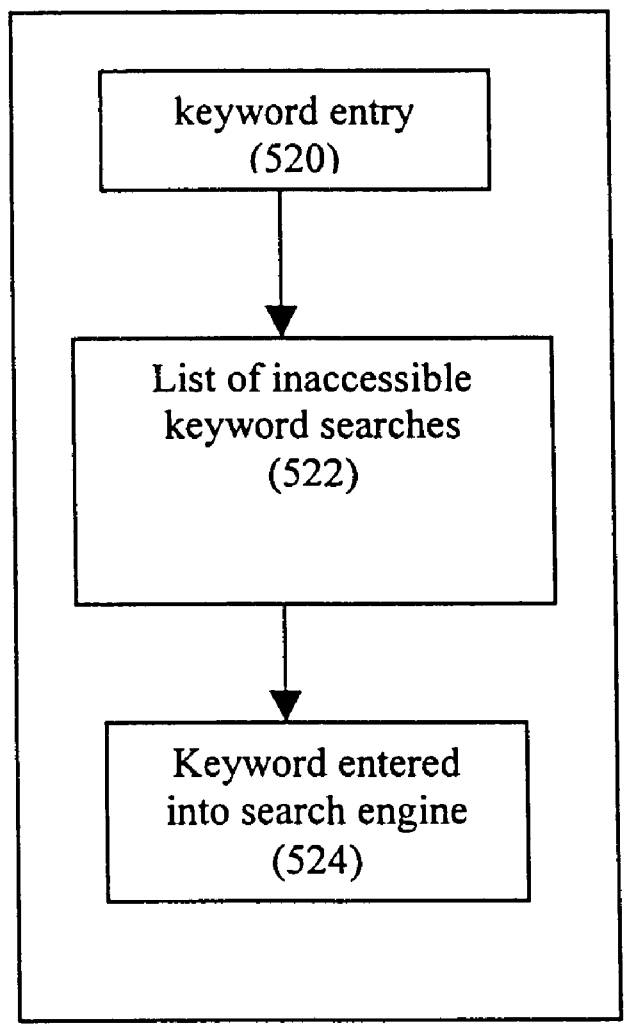
FIG. 15 illustrates a keyword eliminator feature according to the present invention.

In a further embodiment of the invention, there can be included a level of authentication for person's of a certain group to have their search results ally be used for purpose of updating the database relating to that group. For example, doctors who have a user ID that identifies them as doctors may perform a search related to a certain medical condition, and their selections can be tagged and used in the database for that group of doctors as has been previously described. However, although patient's may desire to identify their profile with that of the same group of doctors, their selections are not as significant as those of the actual doctors, and thus while they are able to view the web page listings that doctors deem most pertinent, their selections are not used to update the doctor's group database, since their IDs do not identify them as a doctor Limiting Search Options Another feature of the present invention is keyword eliminator feature, which is illustrated in FIG. 15, and prevents certain users such as children, from searching for undesirable keywords and web-pages when the keyword eliminator feature is turned on. The present inventor's have realized that it is potentially much easier for example, to stop children searching for pornography, rather than attempting to trace and prevent access to all sites on the Internet with pornographic content. This would be used as a complimentary tool to existing "net nanny" type devices. Thus, as shown in FIG. 13, with the keyword eliminator turned on, a preexisting table inaccessible keywords is stored in a table and compared in step 522 with a keyword previously entered, as shown by step 520. Thus, keywords that are inaccessible will not be searched. Thus, for example, parents could choose the types of keywords 552 that they do not want their children to search for—and this will be different for different sets of parents. The system filters out the keywords that may be used for subsequent searching in step 524.

Determining Which Users to Sample

Figure 16:
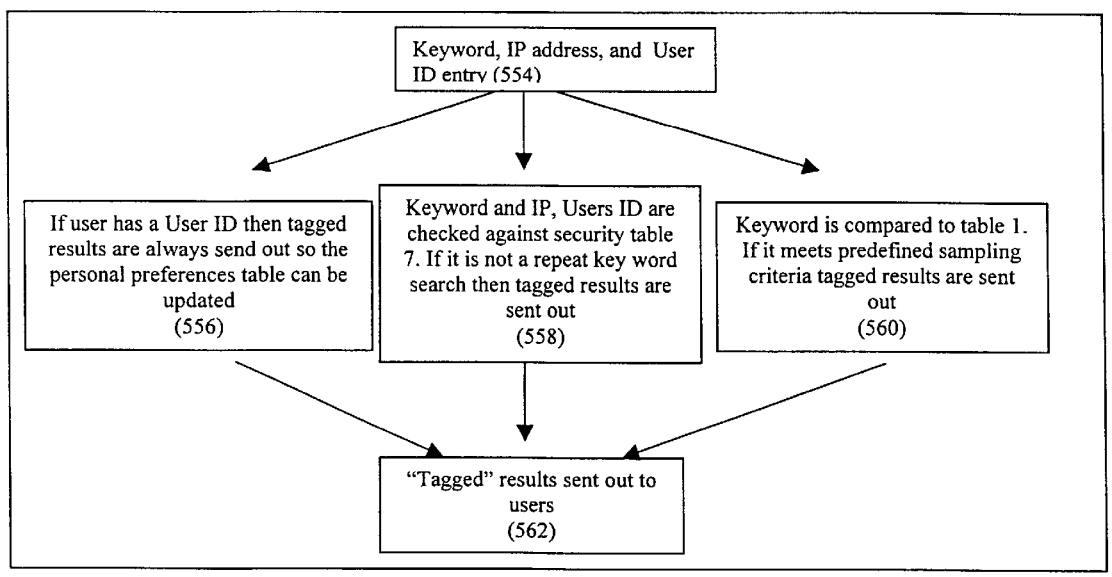
FIG. 16 illustrates the process of determining which search results should be used to make up the cumulative surfer trace table according to the present invention.

FIG. 16 illustrates the process of determining which search results should be sampled and used to make up the cumulative surfer trace table 170 of FIG. 4, also referred to as Table 4. While possible, it is not necessary to collect data concerning every single search, and this can be controlled by determining which sets of results get sent out with "tagged" web pages. Reference with respect to this was already mentioned with respect to authenticating user's of a particular group, doctors in the example provided.

As shown in FIG. 16, after entry of keywords and other data in step 554, there are three decisions that determined whether results are actually "tagged" as has been previously described in step 118 of FIG. 3.

As shown by step 556, for a user that has a user ID and has chosen to use the personal links table 174 of FIG. 5 (Table 6) as previously described, it is necessary to "tag" all of their results so that all of their past preferences are recorded in their personal links table 74. The search engine according to the present invention system can update the user's personal preferences but not update Table 3 if certain security levels have not been satisfied (see below). If, however, the personal link table 174 is stored on an individual's computer rather than at central location there is no need to send out tagged results as the data is stored locally.

As shown by step 558, when a keyword is submitted, a check is made that the IP address 62 has not already searched the keyword using security table 168 (Table 7) before the user is sent a set of tagged results. If so, the user can still undertake the search though it will not contribute to the cumulative surfer trace 170 (Table 4). This allows all normal users to affect the popular hit-list and all users to search whatever they would like, but prevents fraudulent users, such as spammers, from contributing to the popular hit-list. The security table 168 can also include information on links between keywords 52 and a user ID 56 to detect repeat searching.

While it is possible for user's to change the IP address of their computer, this is also detectable and preventable by a number of methods such registering and tracking the use of IP numbers.

Other methods to exclude false searches include:
  Only creating a surfer trace for users with a user ID 554 recorded with the search engine.
  Extending the time limit requited to make a visit count as a useful hit.
  Do not count single visits to a URL from a keyword (for which there is no means of measuring a lapsed-time).

As shown by step 560, popular keywords can be traced once every tenth, hundredth, or even thousandth occurrence, and the frequency of this selection can be changed to optimize the system. The frequency of keyword usage is determined from keyword table 164 as shown in FIG. 5 (Table 1). The frequency of sending out tagged results can also be linked to the rate at which popularity is changing for different key words. For example the keyword "IBM" would probably have IBM's home page at the top and most user's would go there, whereas the key word "latest fads" may have a constantly changes set of web pages that needs to be sampled more frequently.

To avoid the keyword URL link table 172 of FIG. 5 (Table 3) from becoming unduly large, one method is to only register keywords in Table 3 once they reach a certain frequency of usage. This is controlled by not sending out tagged rests for less frequently used keywords (found from Table 1).

Active Suggestion of Web Pages to Visit

Figure 17:
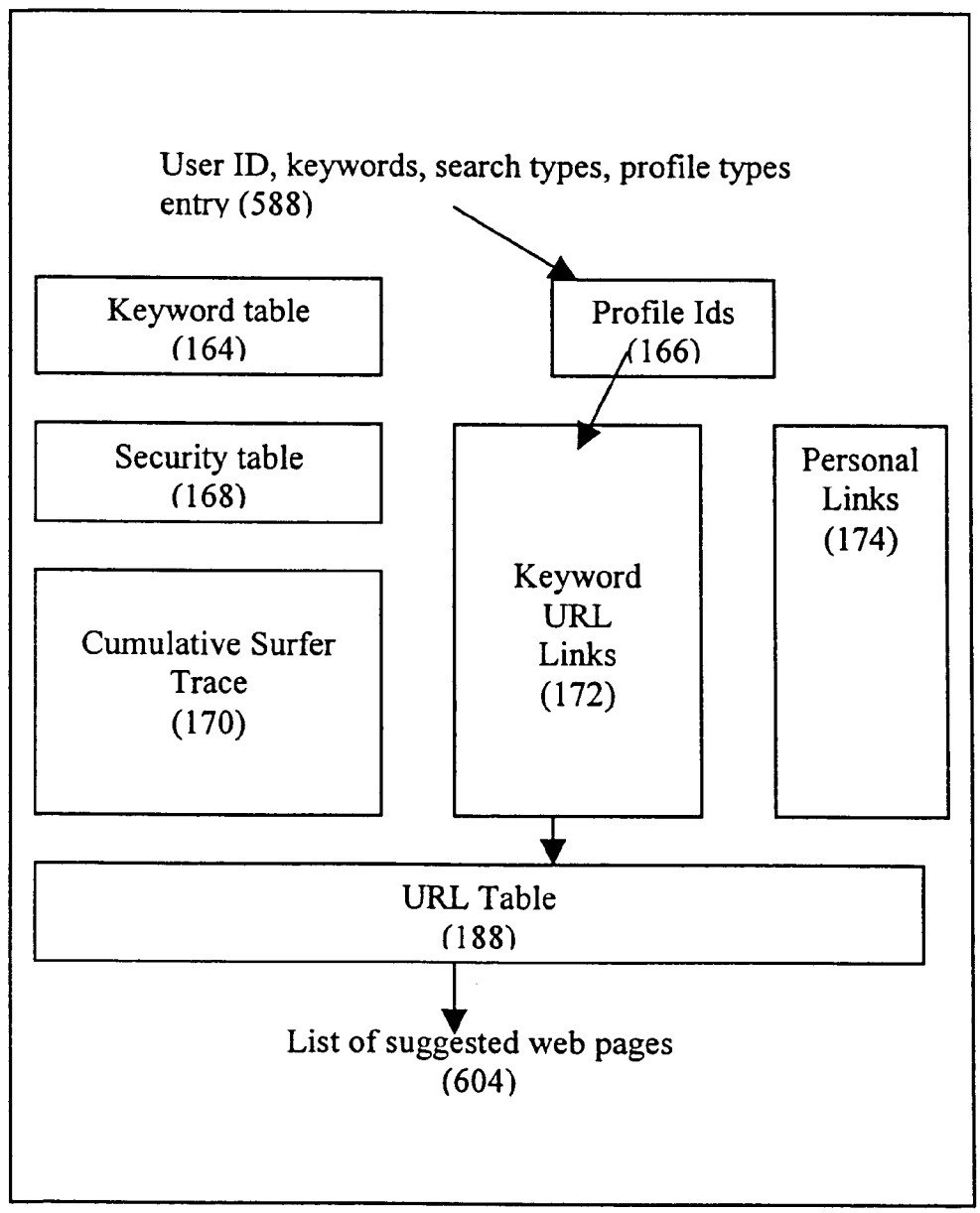
FIG. 17 instates active suggestion of web pages according to the present invention.

Another feature of the present is illustrated by FIG. 17, and involves using data to actively suggest web pages. This is different from a search because the user sets up the request and is informed if there is any new data on the subject. To do this the users has to actively specify which keywords they are interested in and the profile type that they would like to act as a filter or agent and the search type (new, highyflying, popular) in step 588. This information is stored in the user's profile ID 166 shown in FIG. 5 (Table 5).

Thus, at various interval's the user receives a list of suggested web pages determined by a group of like minded humans. For example a user may choose to be notified of web pages with the following.

| Keyword 582 | profile type (agent 588) | Search type 586 |
|---|---|---|
| Rugby | New Zealand, Male | highflying |
| Decay treatments | Dentist | new |

This way if there are highflying web pages on "rugby" that other New Zealand males found useful (i.e. they spent a significant amount of time looking at the information—high rate of change of X in Table 3) the user would be notified. Similarly if there was any new information on "decay treatments" submitted for dentists to look at, the user would be identified about it (value of Z in Table 3). It is unlikely that a computer agent will ever be as good at filtering information as a selected group of peers. An advantage of this system compare to other "agent type" software is that this does not require any software on the user's computer. It is all included as a natural extension to the other search engine data sets.

The suggested web-sites can be displayed for the user when they next access the search engine or they may choose to be notified of these suggested web pages via e-mail notification. This way web pages can be drawn to the user's attention without any active searching for these keywords.

Passive Suggestion of Web Pages to Visit

Figure 18:
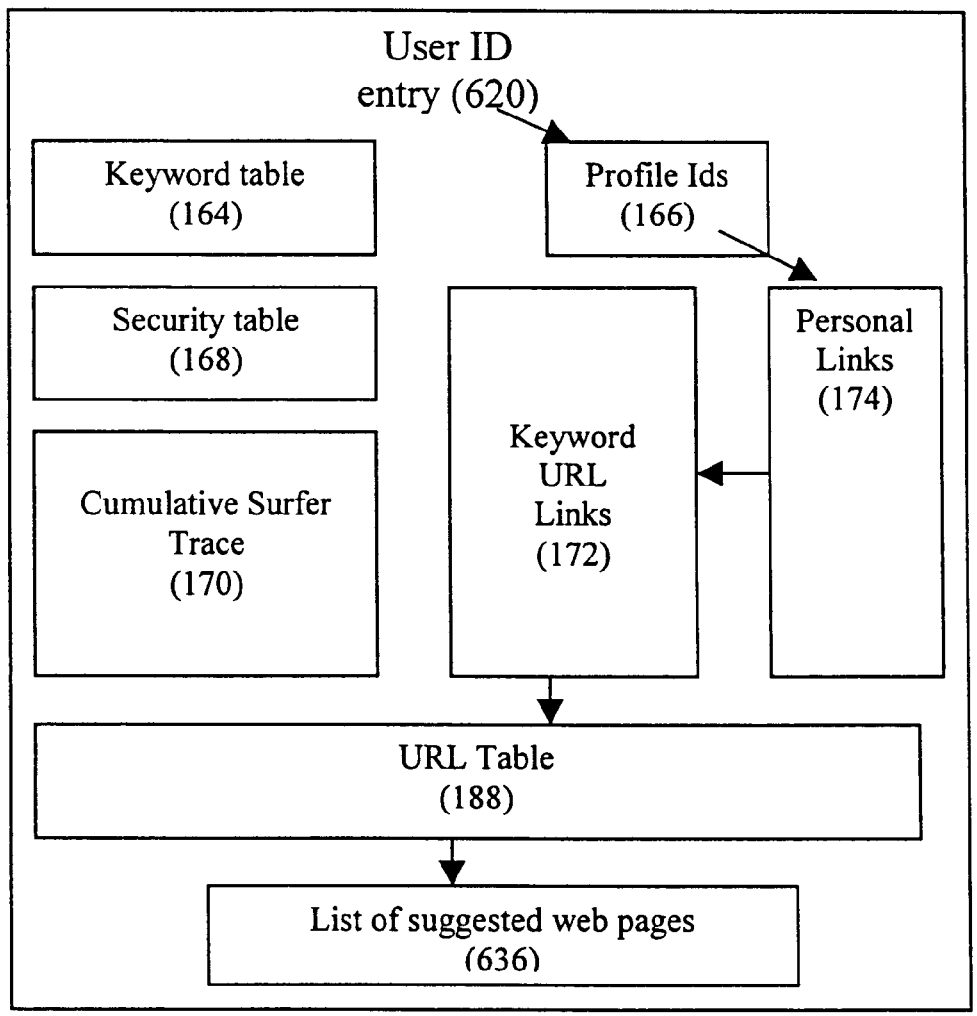
FIG. 18 illustrates passive suggestion of web pages according to the present invention.

Another feature of the present is illustrated by FIG. 18, and involves automatic web-page suggestion based on how the user has searched in the past and requires no active input from the user.

As shown, in step 620, upon the entry of a user ID, the system can be activated passively, at various intervals or times (such as at each login to the search engine), by looking at which so keywords, profile types and search types, the users frequently looks at using the personal links table 174 of FIG. 5 (Table 6). For example, it may be that the user frequently looks at Rugby information as a "New Zealand, male" and looks at decay treatments as a "dentist". This information can be found from the automatic book marking table, previously referred to personal links table 174. If the user has not looked at these subjects for a certain length of time and there are new or highflying information sources, the user will be automatically notified of these new information sources.

In a modification of this embodiment, a periodic e-mail can be sent out with the two newest and highest flying sites related to the key-words of the user.

Determining a List of Suggested Keywords

A problem with Internet searching for Many users is knowing which key-word to use for searching. While the present invention could be implemented with au infinite number of keywords, too many key-words (includes phrases) that users choose can be problematic.

Figure 19:
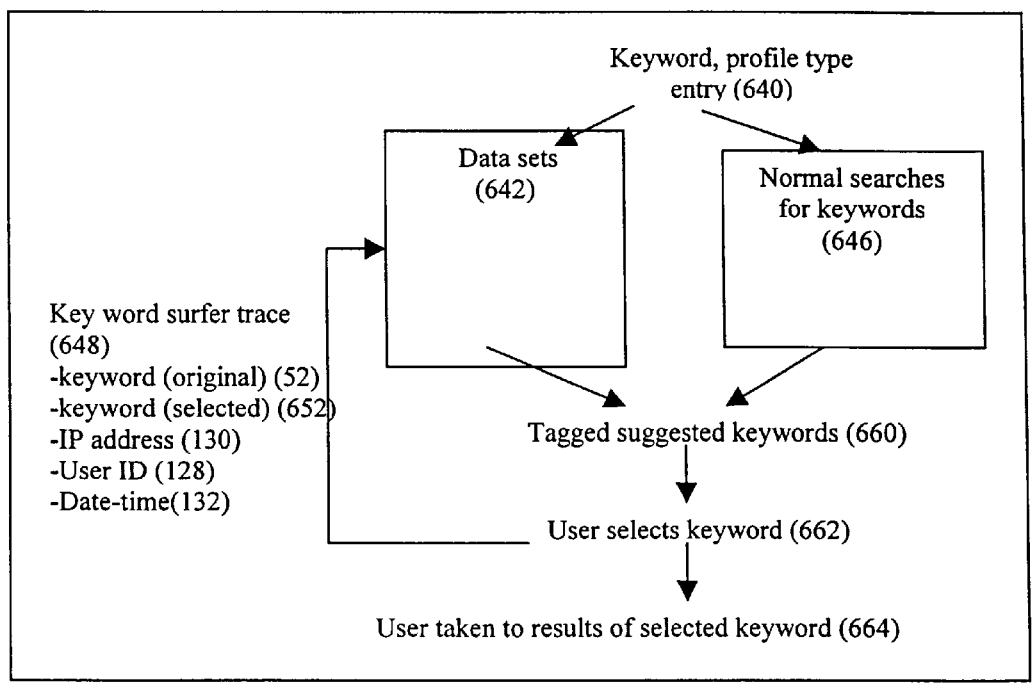
FIG. 19 provides an overview of suggesting keywords according to the present invention.

Accordingly, as shown in FIG. 19, the present invention also provides for a data set 642 that provides synonyms for the keywords entered along with the particular profile type in step 640. The system represented in FIG. 19 is referred to as a key word suggester. This is implemented, in one embodiment, by matching the key-word entered by the user in step 640 with the existing keywords and phrases in keyword table 164 of FIG. 5 (Table 1) that other users have tried using other search methods, identified in step 646. Each keyword is then tagged in step 660, and those that are selected by a user in step 662 are used to form a keyword surfer trace 648 as shown in FIG. 19, which contains the original keyword 52 that the user entered, the keyword selected 652, and the IP address 130, user ID 128 and date-time 132 data as in the previously described web page surfer trace.

The data from the cumulative keyword surfer trace 648 is then used to reinforce links between keywords. In this way the system learns which keywords are associated with each other. The system learns which words are related to each other in the same way that the system learns which URL's are associated with the key-words. The lists of suggested keywords will become more relevant over time as the relevancy is improved each time the keyword suggester is used.

Creating Data Sets that Determine the Suggested Keywords

Figure 20:
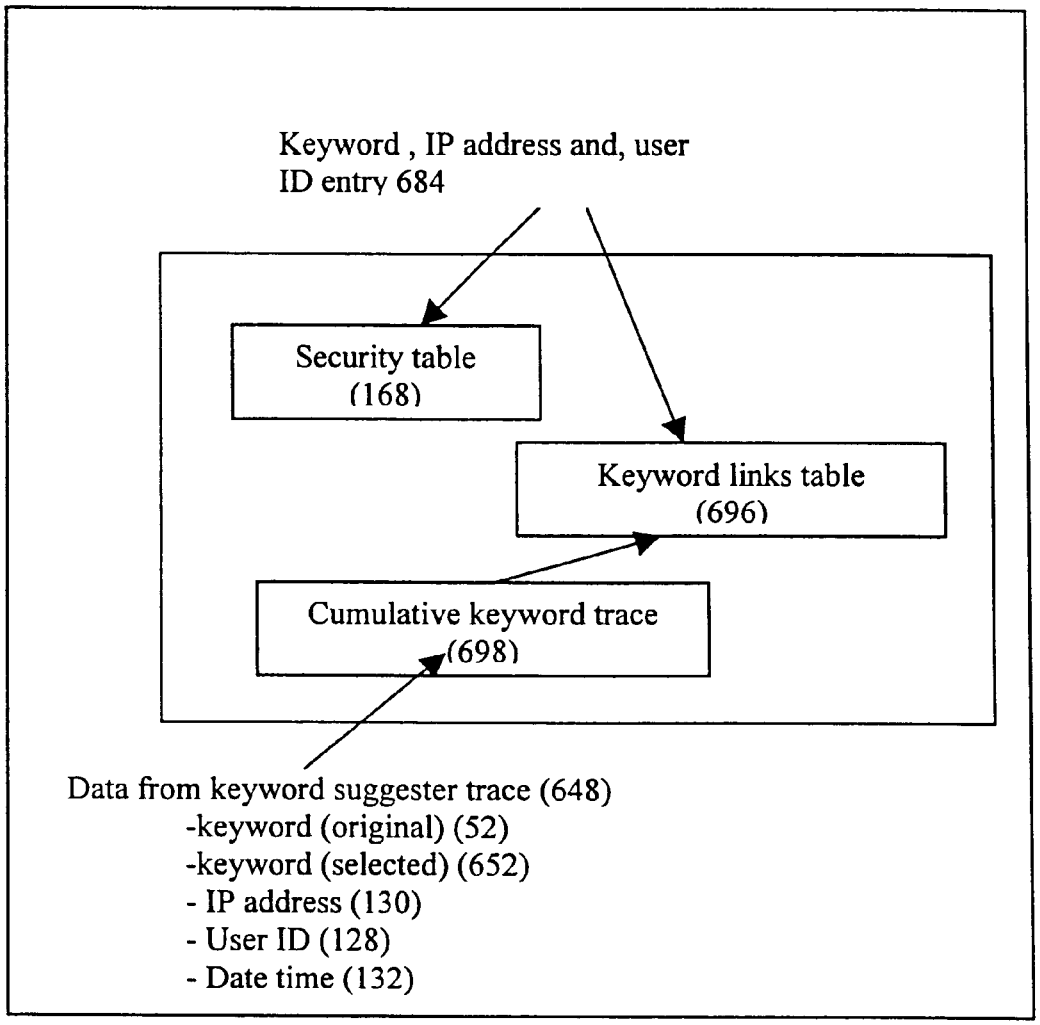
FIG. 20 illustrates the manner of creating data sets for suggested keywords according to the present invention.

As shown in FIG. 20, a keyword link table 696 and a cumulative keyword trace table 698 are used along with the previously described security table 168 to create the data sets for suggested keywords. The key-word link table 696, shown in Table 10 below, records how often each key-word is selected from the suggested key-word list This can then be used to rank the of the usefulness of different key-words relative to each other.

TABLE 10

Keyword link Table

| | Key-word 1 | Key-word 2 | Key-word 3 | Key-word 4 | Key-word 5 |
|---|---|---|---|---|---|
| Key-word 1 | — | 5 | | | |
| Key-word 2 | 20 | — | 1134 | | |
| Key-word 3 | | 356 | — | | |
| Key-word 4 | | | | — | |
| Key-word 5 | | 20 | | | — |
| Key-word 6 | | | 3 | | |
| Key-word 7 | | | | | 168 |

It can be seen from the Table 10 that people who entered key-word 2 found key-word 3 the most useful followed by keyword 5 then key-word 1. The keywords can have a directional aspect, for example, keyword 3 was found useful 1134 times after trying keyword 2. However keyword 2 was found useful only 356 tries after users tried key-word 3.

Information about the links between keywords in Table 10 is updated by the information about how people are using suggested keywords (keyword surfer traces 648). The cumulative keyword surfer trace 698 is the combined information from all individual keyword surfer traces 648 and it is used to determine how many "hits " (significant visits) each keyword had for each key-word.

The information collected from each individual surfer trace is a sees of inputs become a cumulative keyword surfer trace, shown in table form below in Table 11.

TABLE 11

Keyword cumulative surfer trace

| IP Number | User ID | Keyword (original) | keyword (suggested) | Date-time |
|---|---|---|---|---|

FIG. 20 also illustrates how links between keywords in Table 10 can be initiated by recording sequences of key-words that users put into the search engine. If for example someone searches using the keyword "NHL" and then "National Hockey League", this would then draw an association between these two key-words in Table 10 by recording this as one hit. Again this captures the reasoning power of users to define the link between two keywords. Often the keyword in sequence will be totally unrelated to the previous key-word but sometimes it will be relevant If the next user chooses it from the key word selector it will reinforce the key-word link in the same way that repeat selection to web pages reinforces links between a keyword and a URL.

The following is an example of keywords that may be suggested after entering the a simple key-word like "Book"

book sales book reviews specialist books second hand books a used books special edition books All of these key-words (phrases) would come from information seekers (users) and information providers (web-page developers). The most appropriate keywords will emerge naturally over time.

All keywords used by users are entered into the key-word link table 696 of FIG. 20. Thus, if people enter an uncommon keyword such as "cassetes" instead of "cassettes" the key-word suggester will suggest that tithe user tries "cassettes". There is therefore, no need to create a set of URL-keyword links in Table 3 for "cassetes" Thus saving on data space and here is also no need to send a tagged set of results for the keyword "cassetes". Hence there will be less data sent back to the search engine.

It is also a contemplated embodiment to run the keyword suggester like Table 3 and have high flying keyword associations and new keyword associations so the system can learn how keyword associations change over time. For example, the keyword suggester trace wan store the most recent keyword links and modify the main key-word the by a history factor, in tie same way as Table 3 is modified by the cumulative surfer trace.

The cumulative keyword surfer trace 698 is processed in the same way as the cumulative web-page surfer trace 170 of FIG. 5 to reinforce links between keywords in the keyword link table 696 (Table 10). A time variable can also be included so that if a user chooses another keyword very quickly it is assumed that the previous keyword was rot useful and is not counted as a keyword surfer trace.

Figure 21:
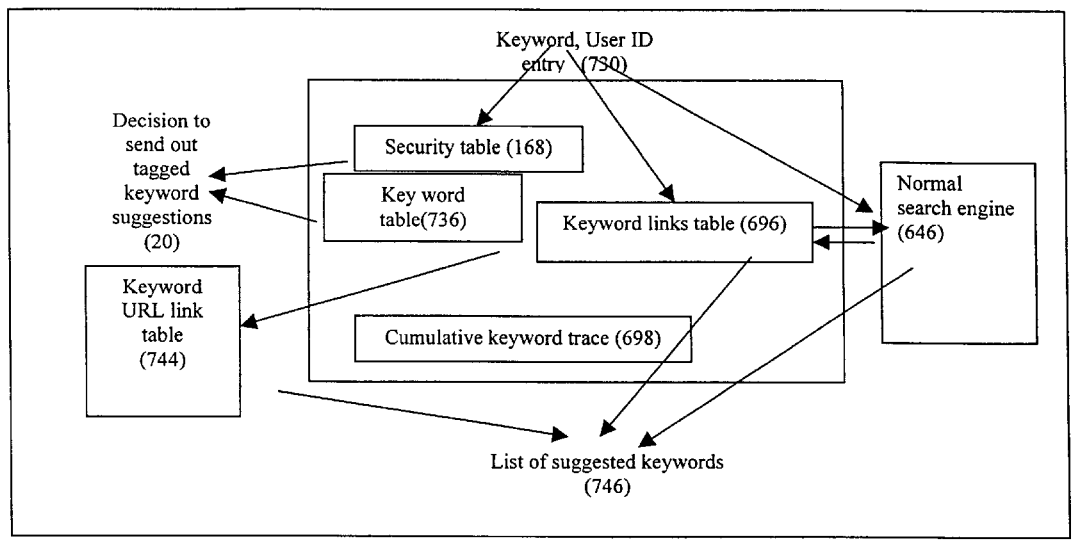
FIG. 21 illustrates a variety of manners in which a list of suggested keywords can be created according to the present invention.

Also, the individual keyword suggester can store, for each user, their personal keyword links. Further, the keyword suggester can be based on a number of different profile types. The word associations may be quite different for people of different culture, nationality, occupation and age etc. Different keyword suggesters wan capture the keyword association of different groups of people. The keyword hits in Table 10 can be subscripted in the same way that the values of X, Y and Z are subscripted for different types of profiles in Table 3, as explained previously. Using the Tables to create a list of suggested keywords FIG. 21 illustrates a variety of manners in which a list of suggested keywords can be created.

One manner is by ranking the values of X in the keyword link table 696 (Table 10). This ranked list of keywords is combined with keywords from a normal search of keywords, described previously with respect to step 646 of FIG. 19.

Another manner of suggesting keywords, shown as step 730, is to compare the popular list (URLs X values) Or the user-entered key-word with the popular-list of other key-words in Table 3. A similarity pattern X values in Table 3 indicates that these keywords are similar. For example a user may search for "film reviews" and the keyword suggester may come up with "movie reviews" which has a more comprehensively searched list of sites. In this case there is no physical similarity between the words movie and film, but they are linked by the similarity of the patterns of URLs links they have in common in Table 3.

The usefulness of the key word suggester list is enhanced indicated by step 744, by associating with each key-word on the suggestion list an indication of whether there are any of the aforementioned searches available (popular, high flyer, etc-) for that key-word in keyword URL links table 172 of FIG. 5 (Table 3). The keywords with the most search results are then highlighted.

Decision to Send Out Tagged Keyword Suggestions List

The security table 168 and keyword link table 696 are used to determine which keyword links to sample in a manner similar to that previously described with respect to tagg web pages. As with the decision for tagging web pages this can depend on whether it is a repeat keyword (found from security table 168) and on the frequency of keyword usage (found from keyword table 164), as well as the considerations previously discussed.

Determining Other Content

Figure 25:
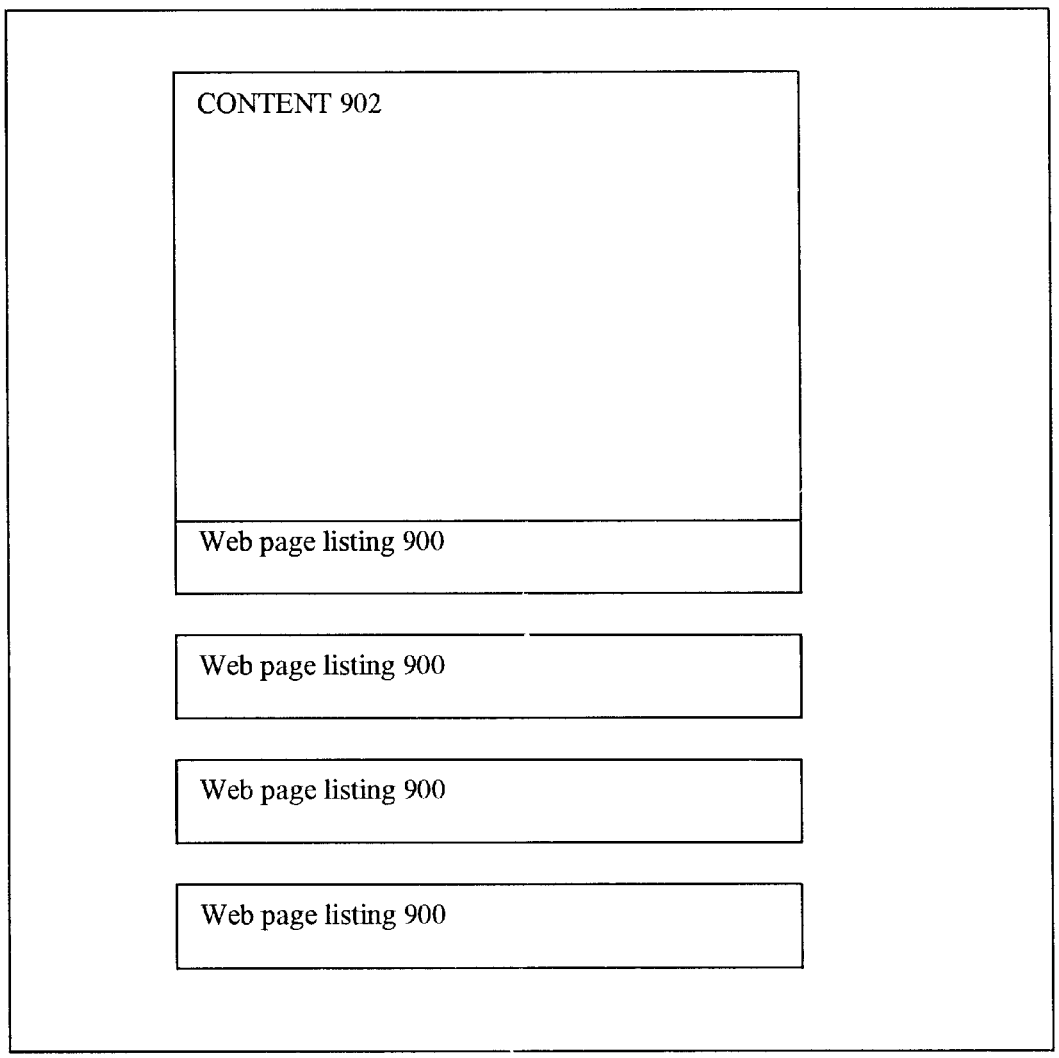
FIG. 25 illustrates web page listings and other content data according to the present invention.

When searching on the Internet, various different web pages listings and web pages are displayed as has been described. One common chacterisics of each these different web page listings that have been described is that when they are displayed they appear substantially identical to one another. As shown in FIG. 25, each of the different listings 900, though the text may be different, is otherwise visually identical. Other listings 902, however, are many times larger than the listings 900, may include graphical content, and appear more prominent when displayed to the user. Such listings can contain the same content as a web page listing, or other content, such as advertisements, pictures, editorials and the like.

This other content maybe displayed to a particular user based upon key-words, user profile type (nationality, age, gender, occupation, and so forth) and the time of the day, for example.

In many instances, this content that is displayed along with web page listings is inserted into the display area using mechanisms that are different from the searching system described previously with respect to conventional search engines. The mechanism by which this content is displayed in large measure based upon some other criteria, such as payment for the space that is used. While the system for selecting this content works, it is difficult to keep track of which content was displayed when, especially if that content is frequently changed. Thus, another aspect of the present invention, which will now be discussed is a system for tracking changing content, and allowing for content providers to dynamically select when their content will be displayed.

Figure 22:
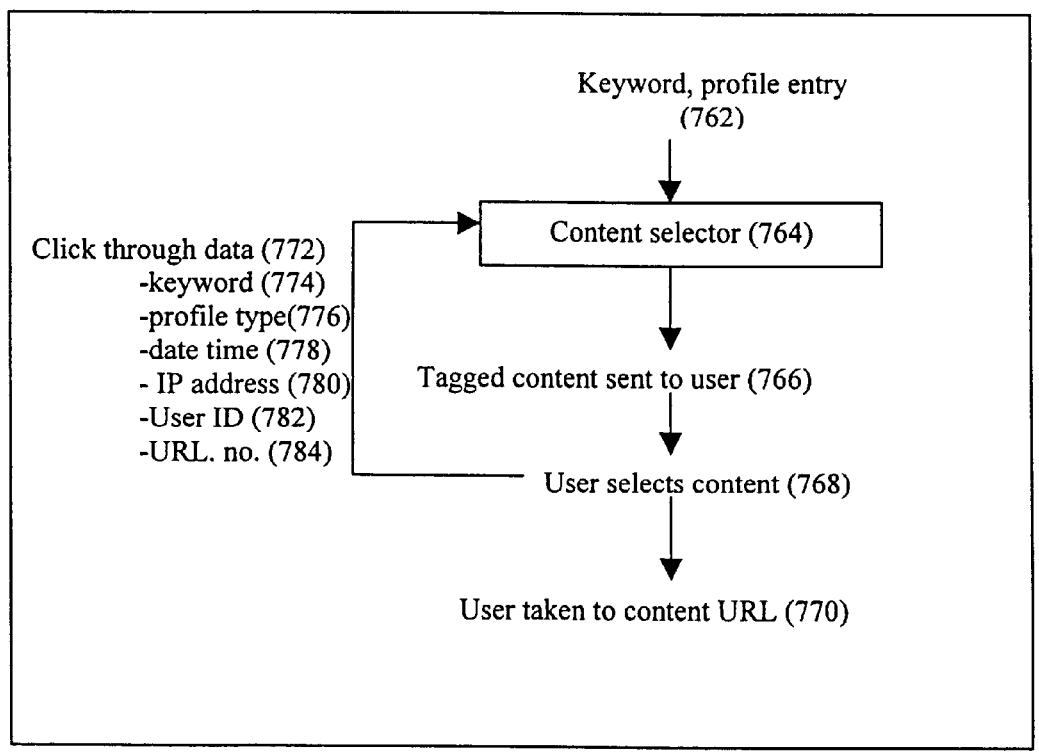
FIG. 22 illustrates how content is attached to web page listings according to the present invention.

This dynamic selectable content as illustrated in FIG. 22, maybe displayed to the viewer based upon keyword or profile type as entered by the viewer in step 762 as shown. Within the content selector step 764 that then follows, the time of the day is considered and used in selecting the appropriate content 902 as illustrated in FIG. 25 along with the web page listings 900. Each content 902 transmitted with the search results made up of web page listings 900 is tagged in step 766. Thus, if a user in step 768 selects that content 902, the results of that selection is fed back to the content selector 764 so that the content database associated therewith, can be updated as surfer trace data in a manner such as has been previously described. Thereafter, in step 770, that content 902 is displayed, typically simultaneously with content 900

In addition to the surfer trace data being input as has been previously described, this content embodiment also provides for the web page developer, or content provider, to determine the frequency with which this content will be reviewed, and, depending upon the patterns of users with respect to web page listings that are viewed alter the manner in which the content provider's content 902 is displayed based upon key words, user profile and the like. In order to implement this dynamic content flexibility, there are three additional data tables, illustrated in FIG. 23, which are used to track the changing content 902. These tables are keyword content data table 804, personal profile content data table 806; and content provider data table 812.

Keyword content data table 804 is illustrated in more detail in Table 12 below, and its characteristics are:

H is the cumulative number or hits for one time period for the keyword. This is the number of times people choose that keyword;

N is the number of times particular content 900 that is associated with a keyword has been sent out for display. This is not necessarily the same as H since content associated with a profile type may be have a different selection factor than content associated with the keyword. Tis selection factor can be various variables, such as votes or price;

A is the selection factor for the keyword from each content provider (e.g. a selection factor could be a $ bid to be associated with that keyword);

T is the total of the selection factors for each keyword and is the sum of A's; and P is the content value, as determined by votes or price, for each keyword and is T/N (e.g. this could be the $ per time content is sent out with that key word—this is a price of being associated with that key word)

TABLE 12

Keyword content data sets

| Keyword | Cumulative hits for one month (H) | Amount of Content sent out (N) | Content Provider 1 (A1) | Content Provider 2 (A2) | Total (T) | (P) |
|---|---|---|---|---|---|---|
| Books | | | | | | |
| Fish | | | | | | |

This Table can also include the maximum content value M that the content provider is prepared to give. There is no limit to the number of content providers that may attempt to have content 902 displayed with a web page listing that is associated with a particular keyword.

It is possible to have a separate Table 12 for each country or area, so that the content value per country or area, per keyword could be different. In addition there could be different content values for different time periods in each country or area.

It is possible that provider's of content 902 could target both the key-word and the audience by identify each of the keywords with target audiences, e.g. the number of hits associated with the word rugby could be broken down into the different profile type s that search for the word rugby. The cumulative number of searches for rugby could be 6000 split into 520 under 21's and 4000 21–50 year olds and 520 50=age group. Thus, there may be a different content value for each of these sub classes within a keyword search.

In addition to the key-word dataset 804 it is possible to have a data set of the following type for different profile types 806. It contains the same entries for each profile type, instead of keyword as described above with respect to the keyword content data table 804 of FIG. 23.

TABLE 13

Personal profile content Table

| Profile type | cumulative hits for one month (H) | Amount of Content sent out (N) | Content Provider 1 (A1) | Content Provider 2 (A2) | Total (T) | (P) |
|---|---|---|---|---|---|---|
| Male | | | | | | |
| Female | | | | | | |
| Professional etc | | | | | | |
| Undefined profile | | | | | | |

Table 13 determines the content value of the content 902 to specific audiences of people as opposed to different keywords and allows for targeting of specific audiences.

It is within the scope of the present invention to include combination profile types in Table 13 as well, such as male, professional or New Zealand, females. The content value for the combined profiles will be different am the content value of individual profiles. The mechanics involved in determining the content value and choosing the content 902 will be the same, and described further hereinafter.

Figure 23:
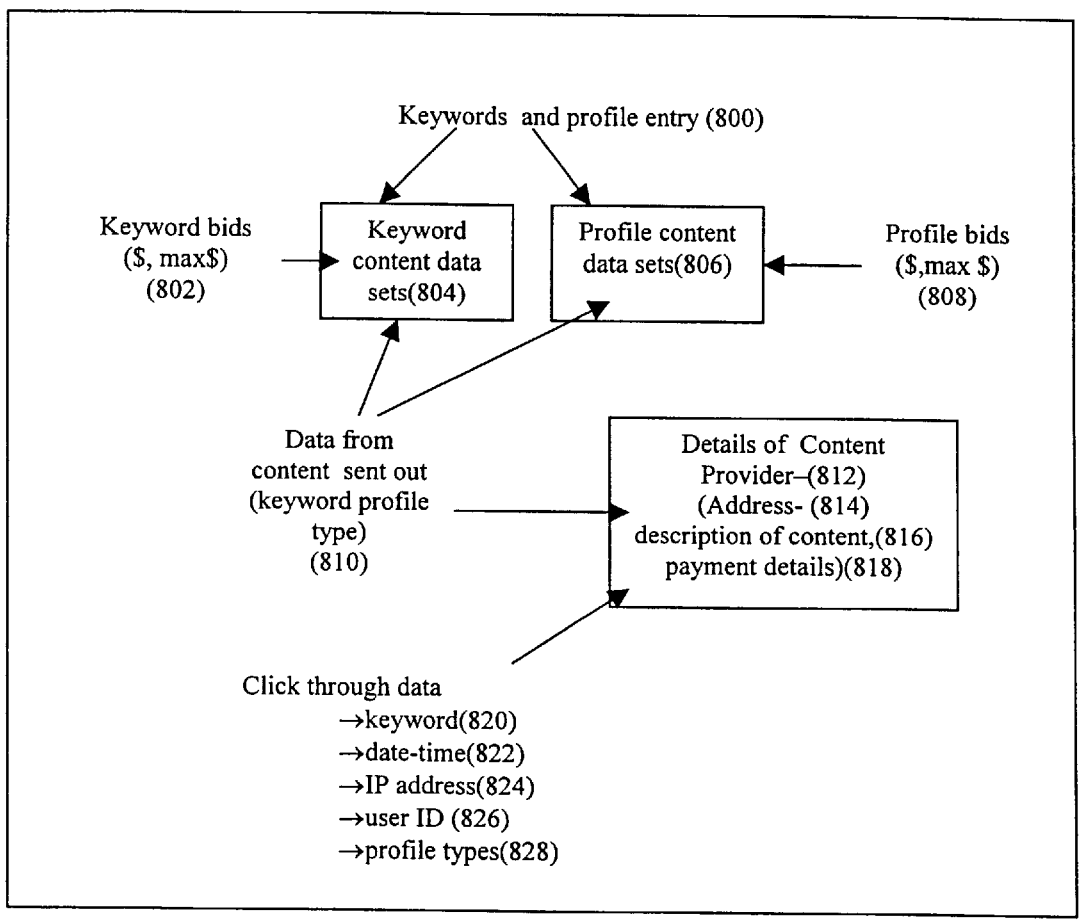
FIG. 23 illustrates various content data sets and operations that populate them according to the present invention.

Content provider data table 812 of FIG. 23 is illustrated in more detail below as Table 14 and contains information about the content provider, such as name, address, advertiser, content information such as the Bitnap (HTML or Java applet or similar) that the content 902 will use and a unique number to identify each different item of content 902.

TABLE 14

| Name | Address etc | Content Information | Unique number for each Content |
|---|---|---|---|
| E.g. John | | | Content. no. |
| | | | Content. no. |

This Table may also store details of the content provider, such as passwords, payment details (e.g. credit card number and authorization), content delivery (number of times content has been sent to users) etc. The data sets for the above mentioned content tables are populated as follows. For the keyword content data table 804

H, the cumulative number of hits for a particular key word for one time period, is taken directly from Table 1 (800).

N is the number of times content is sent out associated with the keyword This is incremented each time all item of content 902 is displayed to a user that is specifically associated with that keyword 810.

The values for A 802 are selected by content providers for each keyword. The content provider can also enter a maximum value M over which they will no longer select to be sent out with the keyword.

T is the total for each keyword and is the sum of As

P is the content value, as determined by votes or price, for each keyword and is T/N Populating the Personal Profile Content Data H is the cumulative number of hits for each profile type and this information is taken directly from Table 1 (sum of the indexed W's).

N is the number of items of content 902 sent out associated with the personal profile. This is incremented each time an item of content 902 is sent out that is specifically associated with that profile type 810

The values for A 808 are placed, through an entry process akin to bidding, for each profile type. The content provider can also eater a maximum M they are prepared to pay, or vote, as the case may be.

T is the total for each profile type, and is the sum of As.

P is the content value for each profile and is T/N

Populating the Content Provider's Details Table

The majority of the content provider's deals 812 are electronically entered by the content providers. Bach time a content provider's content 902 is sent out this event is also recorded in the content provider's details Table 8 12!. This will also record the number of click-throughs (820, 822, 824, 826, 828) and the cost, in terms of payment or votes, of the content 902. This will form the basis of the electronic bill or tabulation that is thereafter forwarded to the content provider.

How the Data Sets are Used to Select Content Sent Out to Users

Figure 24:
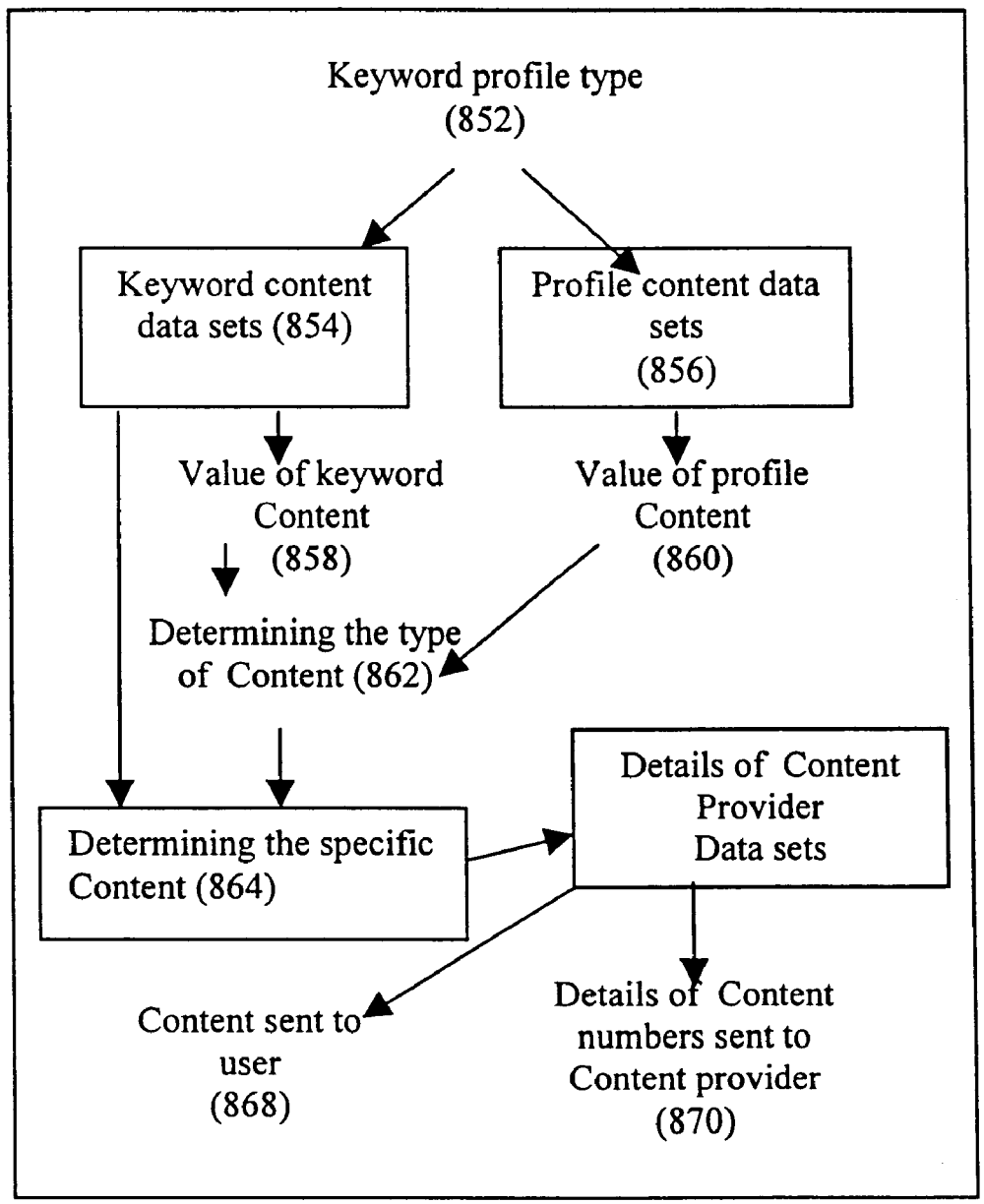
FIG. 24 illustrates various content data sets and operations that are used to select data from them a according to the present invention.

In the discussion that follows, with reference to FIG. 24, it is assumed that only one banner of content 902 is transmitted with each set of web page search results 900. The same olgorithm apply if there are multiple sets of content transmitted with each set of web page results.

A keyword and profile type are submitted to the search engine in step 852. From keyword content data table 804, personal profile content data table 806, the value of content 902 for each is found from the value of P in the Tables. The highest value of P for the keyword or profile type, determined in step 8624 determines the type of content (keyword or profile type) that is transmitted along with the web page listings 900. It may be that there is no specific value for the keyword and the user may not be using a specific profile type. In this case the values for unassigned content items will be used (from Table 13 for users without a profile). Choosing which specific content item 902 is sent out is discussed below, The details for the content item (their graphics, text, associated programs, etc) are taken from Table 14, content provider details table 814 and transmitted to the user in step 868. Details of the content items 902 transmitted for each content provider are also sent to the content provider, as shown by step 870, at regular intervals.

Determining Whether it is Keyword or Profile Content That is Transmitted

The type of content 902 transmitted is dependent upon whether it is a key word based content or profile option based content. For example a Male from the US may search for fish. The value applicable to this search is, keyword=fish, profile=male, profile=US, profile US, male. When deciding which content gets displayed the system compares the value of the content for all the possibilities (keyword combinations of profile types) and sends out the content that has the most value as determined in step 862. For example an under 21 male may search using the key-word "Rugby" and the value for the associated content for Rugby is 0.1 per view, whereas the value per view for targeting an under 21 male is 0.2 and thus the content targeted at the male under 21 would be displayed rather the rugby content. It is important to note that the cumulative frequency of times that content items 902 are transmitted (N) will be different to the total cumulative frequency for the targeted area (H). In this example the cumulative frequency (H) of the number of times 'rugby' is searched for and 'males under 21' would both incremented by one (via Table 1). However, the number of times an item of content 902 is displayed would be incremented only for the 'male under 21' Table (this is the figure used to determine the value of the content per unit view.

Determining Which Specific Content is Transmitted

The example below shows how content associated with the keyword is selected. It is the same process for content associated with profile types.

| Keyword | Cumulative hits for one month (H) | Number of content items sent out (N) | Content Provider 1 (A1) | Content Provider 2 (A2) | Total (T) | (P) |
|---|---|---|---|---|---|---|
| Book | 134 | 134 | | 10 | 10 | 0.050 |
| Fish | 52 | 80 | 5 | 5 | 10 | 0.52 |

For the key-word "took" the content 902 of content provider 2 would be displayed whenever the keyword was searched, as they are the only content provider associated wit that key-word. However, for the key-word "fish", content providers 1 and 2 would have their content sent out the same number of times. In the system scaled to the levels at which it is intended to be used, them will be a very large number of content providers bidding for different keywords and profile types.

Calculating the Value of Content

If there is a new content provider who, for the keyword "book," values the content at, for instance, $5 per month, This will change the value to 0.075 and this will mean that the total associated with the word book is $15. Therefore, content provider 2 would now get transmitted 66% of the time (10/15) and the new content provider would be displayed 33% of the time. The proportion of time an content provider's content is transmitted is A/T.

How Content Provider's Use the Data Tables

When bidding for content 902, content providers select a keyword or profile to target their content from Tables 12 & 13. The search engine indicates automatically the number of times this search has been performed for the previous time period (H), the number of times items of content were sent out associated with that selection (N) and the value of the content P.

The new content provider then enters the selection factor A and the system can then instantly calculate the new value (P) based on the new total bids (T). The advertiser can also be told the number of views per month they are likely to get for their bid (N*(A/T)). These changes are calculated in real-time to give the new content provider an indication of how their bid will influence the value and the views they will receive for their bid. If a value and number of views are agreeable to the advertiser they can choose to submit it as a bid for the defined period, such as a day, week, or month, for instance. The details of other content providers are, preferably, not made public. Content providers may also enter a maximum value M they can pant with for their content. This provides content providers with some security against paying too much if the value changes. If the value goes too high then a content provider's bid can drop off the list (if P is greater than M then A is not counted as a bid for that particular content provider). The bid would go back on the list if the value went down again, thus acting as a stabilizing mechanism. The content provider can, in a preferred embodiment, be notified by e-mail if their content 902 has dropped off the list due to their value limit M .

As shown by the content provider details table 812 of FIG. 24, for instance, content providers thus have an account with the search engine proprietors and procedures for debiting their account for their content is automatically calculated from the account details on a periodic basis. An electronic statement of the number of views, cost per view, number of click-throughs and cost per click-through for each content provider is also forwarded to each content provider, since this information is also stored in content provider details table 812 (Table 14). In a preferred embodiment, it is possible to identify clusters of similar keywords based on the keyword link table. The reason for identifying clusters of keywords is so that content 902 can be targeted at groups of words rather than just individual words. The cluster for the key-word "car" may include hundreds or thousands of words that have links to the word car (e.g. convertibles, automobiles, vans). Statistical clustering techniques are used to define the size and frequency of key-word clusters. This makes it a much more automatic process the an editor deciding on clusters of keywords for content provider's to target.

The same system can be used to set values for keyword clusters. While grouping words in this way would incur an increased administration cost, it is nevertheless computationally similar and only initiated once a certain level of hits on a keyword had been exceeded.

Content only search Users can also purposely choose to search only the content provider associated with a keyword. In this case the search results will be based on the values of A in Table 12. The content providers that pay the most will be at the top of the list.

The key-word suggester can also help content providers choose key-words or sets of key-words that they would like to display.

Controlling the search engine system There are a number of parameters that can change the way in which the search engine according to the present invention ranks web pages. These factors (described in detail below) are:

History factor

This determines the rate of decay of the existing popular lists (popular hit list) as described in the text previously This is a number between 1 and 0. A high history factor will make it difficult to change the existing popularity lists. As an example if the rate of searching for a particular keyword is increasing quickly, then the history factor should be lower to enable emerging web pages to rise up the popularity list.

Frequency of updating Table 3 from the cumulative surfer trace

This is a measure of the frequency with which the popularity lists are updated with information about the users' activities (i.e. the surfer trace), for example, this may be measured once a day or even once a month depending on the rate of change of popularity of particular keyword searches.

Sampling Frequency

This is the frequency of sampling the information of how users are searching. If it is a common keyword it is not necessary to monitor every search. It may be that only a percentage of all searches need be monitored to accurately determine web-page popularity.

The composition of the default search list (mix of results from the new web-page list, high-flyers and popular-lists etc.)

The mix of web pages presented to the user as a default can be changed if necessary to reflect the way in which search results evolve over time.

Content 'hit factor'

The "content hit factor" is a measure of the weighting given to a hit on content being recorded as a hit for a keyword. The default setting is that a hit on content counts the same as a hit from the list of web pages. The value of content hits can be set higher or lower than unity, depending on the price of the content, e.g. the "content hit factor" may need to be increased for valuable keywords as this would decrease the ability to spam these commercially valuable keywords. The higher the content factor, the higher the resistance to spam as the search results would be more dependent on price rather than popularity.

The time period for content bidding

Content providers bid a certain amount for a particular time period e.g. one month. This time period may be different depending on the rate-of-change of the price. If the price is changing rapidly or is very stable, the time period may be respectively shortened or lengthened correspondingly.

Number of key-words per web-page submission

This number could be changed to influence how the system learns from new web pages submissions.

Length of time between accepting new-web-page submissions

If the date of submission for a web-page is too close to the existing submission for that web-page, then it is not accepted. This length of time can be changed depending on any of the above factors Number of searches per day, per person (IP address or user ID) that count as valid hits This number can be changed to reduce the possibility of spamming Length of time before renewing the security Table The security Table that restricts abuse, notes the links between keywords and IP addresses of user identifications. The length of time between refreshing this Table can be changed to make it harder to spam the system.

The settings for these factors can be different for different keywords or groups of people depending on:

Frequency with which searches are done

The rate of-change of frequency of searches

The price of the content

The rate of change of price of content

The precise setting of each of these factors will not be known until the system begins operation 'learning' about the users behaviors. The optimum settings for different situations may be determined by experimentation.

Other Applications

Though the preferred embodiment has been described with reference to a software useable on a computer network for searching the Internet, it will be appreciated that the invention may be readily applied to any search system where a human user chooses results from a set of initial search results. Such a system may for example be part of an, a LAN or WAN or even a database on an individual PC.

Examples of other possible areas of application for the present invention are described below.

Intranet Searches and Other Data Base Searches

Intranet searches at present suffer from similar drawbacks from Internet searches, indeed some intranets can in themselves be extremely substantial systems, in which identifying a particular information source or item can be equally problematic. Utilizing the present invention in such applications is within the intended scope of the present invention.

Searching Other Media Forms

The present invention is also intended to be applied matching a user's profile to other media sources (such as pay per-view, television, videos, music and the like), thus allowing content targeted to a particular audience. The same form of search lists as described above (Popular-list, High-flyers, Hot-off the press etc) may be employed to direct users to appropriate material Shopping The search techniques described herein can be implemented in a consumer network to assist shoppers in select items from within one shop or among a large number of shops Instead of using a keyword-URL link Table, there would be used a keyword-item purchased link Table, that then records what items were purchased after each shopping request (key-word). This embodiment also records where the user purchased the product. Each time a shopper purchased an item this would increment the popularity of that item, using the same techniques described previously.

The profile type s in this embodiment can be used to record the types of purchases made by different sets of people. One could, for example, select a profile type and see what are the most commonly purchased items for a range of users, and would provide assistance in choosing gifts for people who have a different profile type than yourself.

Scientific Publications

Searching scientific data bases (on-line papers, journals, etc.) with the present invention will dramatically reduce the time spent examining obscure, or esoteric areas only to find the information irrelevant e criteria for a valid hit for such uses would typically incorporate the extended time feature described above to establish the usefulness of the information source. The refereeing and referencing of academic/scientific papers using the present invention could enhanced by classifying different levels or types of user, e.g. Dr, Professor etc. postgraduate, and so forth. This will enable users to see. for example, what information sources the eminent authorities in a particular field found of interest. It would also allows the authors of a paper to become aware of how often their publication was accessed and possibly further indicate where and how often the paper was used as a reference in subsequent papers. Users may have to formally register with different organizations to obtain levels of ability to referee. Users may also choose the level of refereeing for their searching.

Online Help

There is currently a substantial global requirement for online help and support particularly for computer/software applications. Such a need would be considerably assuaged by use of the present invention as the software developers obtain a direct feedback to the type and frequency of particular inquiries, whilst the uses receive the accumulated benefit of the previous users. Different profile type s would enable the answers to be provided in an appropriate form for the user, e.g. novice, expert, etc. The keyword suggester may, for example, suggest searching with key-words (questions) more likely to yield a satisfactory response. There can be a range of answers to each question and as the system learns it will converge on to the best answers.

Question and Answer Services

Current On-line question/answer programs could be configured to run via the present invention thus enabling answers to repeatedly asked questions to be based on previous questions and similar questions to be suggested.

Content Optimization on Other Parts of the Internet

The same content bidding mechanism could be used to determine the price of content for any location on the Internet, not just web page listings as identified above. In this embodiment, content providers will bid for a general content space to set the price automatically.

The profile type information from the search engine could be used as a passport so that other advertisements on the Internet could be more targeted to different audiences. This profile type information could also be used by web-page developers to customize their web-page for different sets of users.

People Matching Service

In another embodiment, the system according to the present invention can be used as a dating service and/or a method for matching people with similar preferences by doing a statistical analysis to compare the individual preferences (Table 6) of groups of users. The individual past preference Tables, in this embodiment, would preferably be normalized and compared to each other using a standard correlation coefficient. When compared to other users it would give a numerical indication of how similar their preferences are.

The same embodiment could also be used to find information about similar people from there past preferences Tables. For example one could ask to be give the names of people in New Zealand with an interest in Ecological Economics and a search could be made of the personal preferences Tables. Such an embodiment, however, would typically include a password/consent indicator that provides consent of identified persons to give out their information, which consent could be given, for example, in only certain circumstances, which circumstances are limited to searchers who have a level of authority and password indicating the same, or for persons who identity themselves with certain characteristics.

While the invention has been described in connection with what is presently considered to be the most practical and preferred embodiments, it is understood that the invention is not limited to the disclosed embodiment For example, each of the features described above can be use singly or in combination, as set forth below in the claims, without other features described above which are patentably significant by themselves. Accordingly, the present invention is intended to cover various modifications and equivalent arrangements included within the spirit and scope of the appended claims.

We claim:

1. In a computer network having a plurality of user sites, a method of weighting the relative importance of a plurality of data items stored in a database on a server computer comprising the steps of:

receiving at said server computer one or more keywords from user sites;

generating at said server computer a plurality of listings corresponding to said keyword, each listing also corresponding to one of said data items;

transmitting from said server computer to one of said user sites said plurality of listings;

detecting at said server computer which ones of said plurality of data items are selected by said user site, said user site being transmitted each selected one of said data items upon selection of said corresponding listing by said user site;

updating said database to weight said selected ones of said data items as relatively more important than unselected ones of said data items with respect to said keyword;

wherein said step of detecting only detects each keyword one time from each user site during a determined interval of time; and wherein said step of generating uses a history factor associated with each keyword in determining said plurality of listings, wherein said history factor is a number less than or equal to 1 and greater than or equal to 0.

2. In a computer network having a plurality of user sites and developer sites, a method of populating a database on a server computer comprising the steps of:

entering a plurality of data items into said database from said developer sites, each of said data items entered into said database including as associated identifiers a plurality of associated keywords;

updating said database by entering a plurality of user traces, each of said user traces identifying one of said data items and an associated keyword so that each trace increases the relative importance of the associated data item with respect to said associated keyword, wherein said step of updating only updates each keyword one time for each user during a determined interval of time; and wherein said step of updating each keyword one time includes the steps of:

associating an identifier with each user, wherein each of said user traces including the user identifier, wherein said user identifier is used to update a user table; and using said identifier to track keywords that have been entered by each user.

3. A method according to claim 2, wherein said user table includes user traces corresponding to a plurality of different types of searches performed by the user.

4. A method according to claim 3 wherein one of the types of searches performed by the user corresponds to keyword searches that have been most recently updated.

5. A method according claim 2 wherein a particular user has a plurality of user identifiers, each user identifier corresponding to a different user profile.

* * * * *